(12) United States Patent
Marcus

(10) Patent No.: US 10,369,388 B2
(45) Date of Patent: *Aug. 6, 2019

(54) UAV- OR PERSONAL FLYING DEVICE-DELIVERED DEPLOYABLE DESCENT DEVICE

(71) Applicant: Robert Marcus, Lafayette, CA (US)

(72) Inventor: Robert Marcus, Lafayette, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/971,949

(22) Filed: May 4, 2018

(65) Prior Publication Data

US 2018/0250535 A1 Sep. 6, 2018

Related U.S. Application Data

(63) Continuation of application No. 13/474,618, filed on May 17, 2012, now Pat. No. 9,987,506, which is a
(Continued)

(51) Int. Cl.
*A62B 5/00* (2006.01)
*E06C 5/00* (2006.01)
(Continued)

(52) U.S. Cl.
CPC .......... *A62B 5/00* (2013.01); *B64C 2201/128* (2013.01); *E06C 1/56* (2013.01); *E06C 5/00* (2013.01); *E06C 9/14* (2013.01)

(58) Field of Classification Search
CPC ....... A62B 5/00; E06C 5/00; B64C 2201/128; B64C 2201/126; B64D 1/02
See application file for complete search history.

(56) References Cited

U.S. PATENT DOCUMENTS

| 275,197 A | 4/1883 | Griffin |
|---|---|---|
| 1,406,972 A | 2/1922 | Bryant |
| (Continued) | | |

FOREIGN PATENT DOCUMENTS

| DE | 19638704 | 4/1998 |
|---|---|---|
| EP | 2465582 | 6/2012 |
| (Continued) | | |

OTHER PUBLICATIONS

U.S. Appl. No. 12/969,421, filed Dec. 15, 2010, entitled UAV-Delivered Deployable Descent Device, by Robert Marcus.
(Continued)

*Primary Examiner* — Philip J Bonzell
*Assistant Examiner* — Tye William Abell
(74) *Attorney, Agent, or Firm* — Weaver Austin Villeneuve & Sampson LLP

(57) ABSTRACT

An unmanned aerial vehicle (UAV) or manned/unmanned personal flying device (PFD) may be used to deliver a deployable descent system to an elevated location at which people await rescue, such as people trapped in an upper story of a burning building. The UAV or PFD may be used to deliver the descent system, attach the descent system to the building, and deploy the descent system. After deployment, the descent system may be tensioned to prevent sway and facilitate descent. Standoffs may be installed or integrated into the descent system to provide for adequate handholds for descending individuals. Various equipment and methods used in such systems are described herein.

21 Claims, 24 Drawing Sheets

Related U.S. Application Data continuation-in-part of application No. 12/969,421, filed on Dec. 15, 2010, now abandoned.

(51) Int. Cl.
*E06C 1/56* (2006.01)
*E06C 9/14* (2006.01)

(56) References Cited

U.S. PATENT DOCUMENTS

| | | | |
|---|---|---|---|
| 1,683,138 | A | 9/1928 | Kautz |
| 2,378,913 | A | 6/1945 | Dahlander |
| 2,979,154 | A | 4/1961 | Bell |
| 3,228,044 | A | 1/1966 | Mattenson |
| 3,301,347 | A | 1/1967 | Saita et al. |
| 3,633,708 | A | 1/1972 | Heilskov |
| 3,741,340 | A | 6/1973 | Andrews |
| 3,809,181 | A | 5/1974 | Staranick et al. |
| 3,894,613 | A | 7/1975 | Elizondo |
| 4,113,207 | A * | 9/1978 | Dalziel .............. B64D 1/22 182/137 |
| 4,256,199 | A * | 3/1981 | Sellards .............. A62B 1/00 182/11 |
| 4,267,987 | A | 5/1981 | McDonnell |
| 4,401,183 | A | 8/1983 | Schler |
| 4,588,148 | A * | 5/1986 | Krauchick ........... A62B 1/02 182/63.1 |
| 4,770,373 | A * | 9/1988 | Salo .................. B64D 1/22 182/198 |
| 4,934,629 | A * | 6/1990 | Brant ................. A62B 1/02 169/53 |
| 5,120,101 | A | 6/1992 | Vranish |
| 5,419,514 | A | 5/1995 | Ducan |
| 5,823,468 | A | 10/1998 | Bothe |
| 5,890,441 | A | 4/1999 | Swinson et al. |
| 6,260,796 | B1 | 7/2001 | Klingensmith |
| 6,270,038 | B1 | 8/2001 | Cycon et al. |
| 6,286,783 | B1 | 9/2001 | Kuenkler |
| 6,655,631 | B2 | 12/2003 | Austen-Brown |
| 6,892,980 | B2 | 5/2005 | Kawai |
| 7,267,300 | B2 | 9/2007 | Heath et al. |
| 7,364,114 | B2 | 4/2008 | Wobben |
| 7,857,253 | B2 | 12/2010 | Yoeli |
| 8,152,096 | B2 | 4/2012 | Smith |
| 8,205,820 | B2 | 6/2012 | Goossen et al. |
| 8,251,307 | B2 * | 8/2012 | Goossen ............. B64C 39/024 244/23 C |
| 8,590,828 | B2 | 11/2013 | Marcus |
| 1,242,286 | A1 | 10/2017 | Weinandt |
| 2003/0116380 | A1 * | 6/2003 | Xia ................... A62B 1/20 182/48 |
| 2005/0061910 | A1 | 3/2005 | Wobben et al. |
| 2005/0151001 | A1 | 7/2005 | Loper |
| 2005/0178879 | A1 | 8/2005 | Mao |
| 2006/0016930 | A1 | 1/2006 | Pak |
| 2006/0038059 | A1 | 2/2006 | Perlo et al. |
| 2006/0202088 | A1 | 9/2006 | Padan |
| 2006/0226281 | A1 | 10/2006 | Walton |
| 2006/0284002 | A1 | 12/2006 | Stephens et al. |
| 2007/0246601 | A1 | 10/2007 | Layton et al. |
| 2008/0006737 | A1 | 1/2008 | Wobben |
| 2008/0048065 | A1 | 2/2008 | Kuntz |
| 2009/0008499 | A1 | 1/2009 | Shaw |
| 2009/0084890 | A1 | 4/2009 | Reinhardt |
| 2009/0283629 | A1 | 11/2009 | Kroetsch et al. |
| 2010/0044499 | A1 | 2/2010 | Dragan et al. |
| 2010/0243794 | A1 | 9/2010 | Jermyn et al. |
| 2010/0301168 | A1 | 12/2010 | Raposo |
| 2011/0042509 | A1 | 2/2011 | Bevirt et al. |
| 2011/0042510 | A1 | 2/2011 | Bevirt et al. |
| 2011/0084162 | A1 | 4/2011 | Goossen et al. |
| 2011/0204188 | A1 | 8/2011 | Marcus |
| 2011/0226892 | A1 | 9/2011 | Crowther et al. |
| 2012/0043413 | A1 | 2/2012 | Smith |
| 2012/0091257 | A1 | 4/2012 | Wolff et al. |
| 2012/0152654 | A1 | 6/2012 | Marcus |

FOREIGN PATENT DOCUMENTS

| | | |
|---|---|---|
| GB | 2490640 | 11/2012 |
| JP | 2009-57044 A | 3/2009 |
| WO | 2003/074924 | 9/2003 |
| WO | 2008/025139 | 3/2008 |
| WO | 2011/106320 | 9/2011 |

OTHER PUBLICATIONS

U.S. Office Action dated Apr. 12, 2012, from U.S. Appl. No. 12/969,421.
International Search Report and Written Opinion dated Apr. 15, 2011, from Application No. PCT/US2011/025741.
VBSS Steel Caving Ladder, http://climbinggearinc.com/lm-steel-caving-ladder-p-4806.html.
Paul Y. Oh et al., "Designing an Aerial Robot for Hover and Stare Surveillance", IEEE International Conference on Advanced Robotics, pp. 303-308, Seattle WA, Jul. 2005. Retrieved on Feb. 25, 2010 from http://prism2.mem.drexel.edu/-paul/papers/ohIcar2005.pdf.
Wikipedia "Gyrodyne", downloaded on Feb. http://en.wikiredia.org/wiki/Gyroclyne.
"A Mule that flies", Machine Design.com, Sep. 24, 2009.
Draganflyer RC Helicopters in VECPAV Autonomous Control System at Vanderbilt University, NV, USA, downloaded Sep. 15, 2009, http://www.rchelicopter.com/2007/11/22/draganilyer-uav-vanderbilt-universitydrone/.
S. Salazar et al. Modeling and Real-Time Stabilization of an Aircraft Having Eight Rotors, Journal of Intelligent and Robotic Systems, vol. 54, Nos. 1-3, Mar. 2009, pp. 455-470.
"Oemichen 1922", downloaded Sep. 21, 2009, http://www.aviastar.orgthelicoptersengloemichen.php.
Tim Lynch, "The Heli-Claw: A New Way to Transport Mulch for Erosion Control", U.S. Dept. of Agriculture Forest Service, Technology & Development Program, May 2008.
U.S. Office Action dated Oct. 4, 2012, from U.S. Appl. No. 12/712,094.
U.S. Office Action dated May 3, 2013, from U.S. Appl. No. 12/712,094.
U.S. Notice of Allowance dated Aug. 20, 2013, from U.S. Appl. No. 12/712,094.
U.S. Final Office Action dated Jul. 23, 2012, from U.S. Appl. No. 12/969,421.
U.S. Office Action dated Aug. 23, 2013, from U.S. Appl. No. 12/969,421.
International Preliminary Report on Patentability dated Sep. 7, 2012, from Application No. PCT/US2011/025741.
Extended European Search Report dated Jun. 14, 2013, from Application No. 11193009.5.
U.S. Office Action dated Jun. 5, 2013, from U.S. Appl. No. 13/474,618.
U.S. Final Office Action dated Oct. 31, 2013, from U.S. Appl. No. 13/474,618.
U.S. Office Action dated Mar. 24, 2014, from U.S. Appl. No. 13/474,618.
U.S. Final Office Action dated Sep. 23, 2014, from U.S. Appl. No. 13/474,618.
U.S. Examiner's Answer to Appeal Brief dated Feb. 4, 2015, from U.S. Appl. No. 13/474,618.
U.S. Decision on Appeal dated Nov. 16, 2017, from U.S. Appl. No. 13/474,618.
U.S. Notice of Allowance dated Feb. 8, 2018, from U.S. Appl. No. 13/474,618.

* cited by examiner

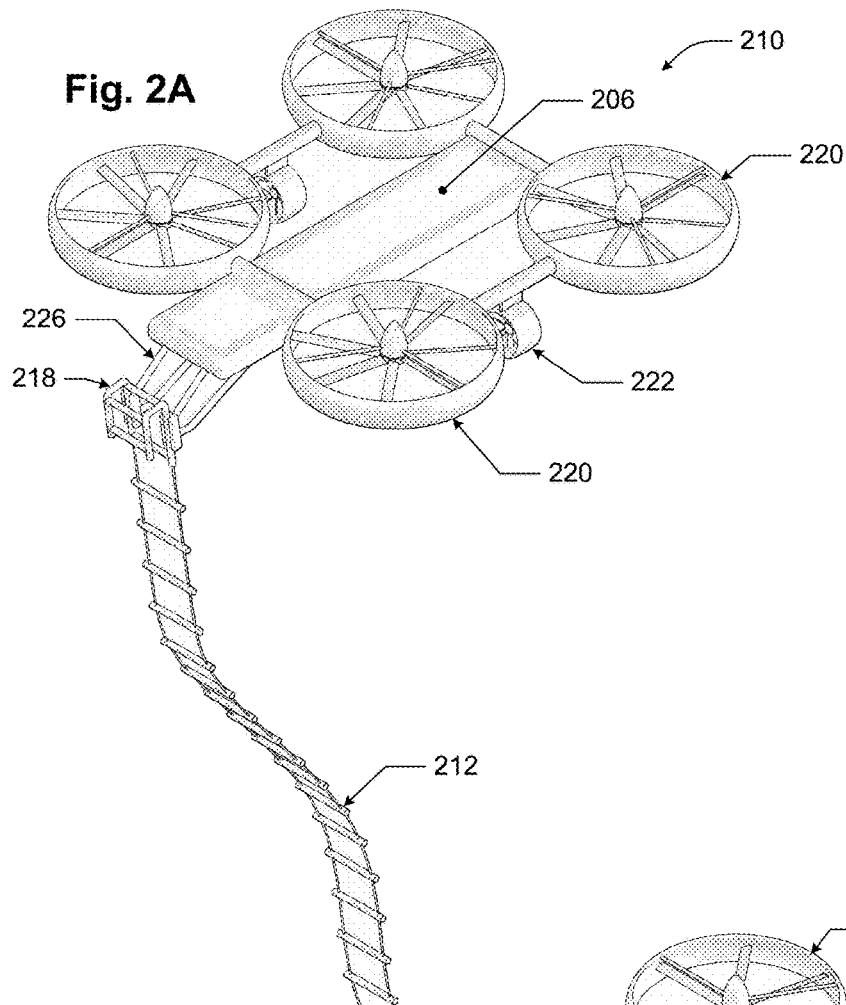
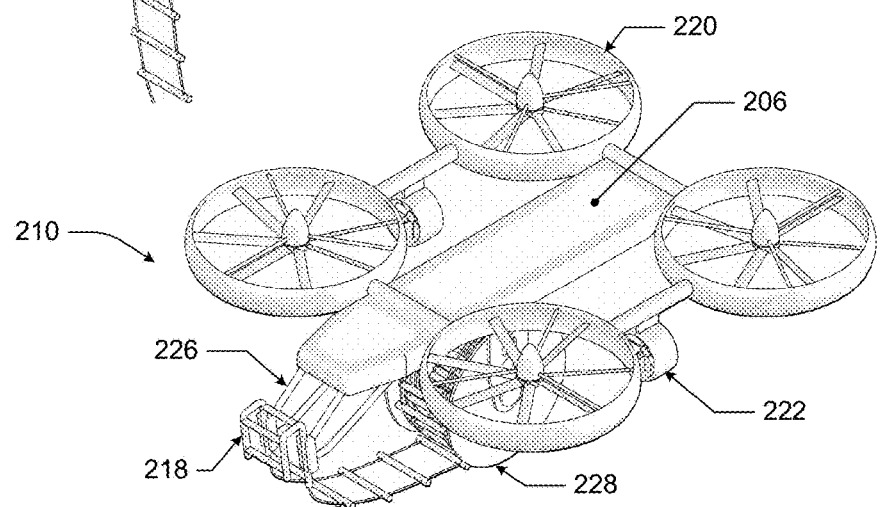

UAV- OR PERSONAL FLYING DEVICE-DELIVERED DEPLOYABLE DESCENT DEVICE

CROSS-REFERENCE TO RELATED APPLICATIONS

This application is a continuation application of U.S. patent application Ser. No. 13/474,618, filed May 17, 2012, and titled "UAV—OR PERSONAL FLYING DEVICE—DELIVERED DEPLOYABLE DESCENT DEVICE," which is itself a continuation-in-part of U.S. patent application Ser. No. 12/969,421, and titled "UAV-DELIVERED DEPLOYABLE DESCENT DEVICE" filed Dec. 15, 2010, both of which are incorporated herein by reference in their entireties and for all purposes.

BACKGROUND

Modern multi-story structures such as multi-story buildings may rise to heights of many hundreds of feet and include dozens of floors. Due to their height, structural constraints, and floorplans, multi-story buildings typically have limited egress routes for people located on floors above ground level. During a fire or other life-threatening emergency in a building, there is a possibility that people located within the building will not be able to access the egress routes to self-rescue and will instead require rescue by a third party.

SUMMARY

In some implementations, a method is provided. The method may include delivering a first deployable descent device to an elevated, substantially vertical first location with a station-keeping-capable, personal flying device (PFD), the first deployable descent device having a first end and a second end. The method may further include anchoring the first end of the first deployable descent device to a feature at the elevated, substantially vertical first location while the first end of the first deployable descent device is supported by the PFD and deploying the first deployable descent device such that the second end of the first deployable descent device is at a lower altitude than the first end of the first deployable descent device after deployment.

In some implementations, the method may further include anchoring the second end of the first deployable descent device to a second location at a lower altitude than the elevated, substantially vertical first location and inducing a tensile load in the first deployable descent device between the first end and the second end in addition to any tensile load attributable to the weight of the first deployable descent device. In some implementations, the method may also include providing two or more standoffs configured to offset a substantial portion of the first deployable descent device from a substantially vertical surface located between the elevated, substantially vertical first location and the second location and offsetting the first deployable descent device from the substantially vertical surface with the standoffs.

In some implementations, the method may include equipping the PFD with a second deployable descent device, the second deployable descent device having a first end and a second end. The method may also include delivering the second deployable descent device to the second end of the first deployable descent device with the PFD, attaching the first end of the second deployable descent device to the second end of the first deployable descent device while the first end of the second deployable descent device is supported by the PFD, and deploying the second deployable descent device such that the second end of the second deployable descent device is at a lower altitude than the first end of the second deployable descent device after deployment.

In some implementations, the method may also include retrieving the first deployable descent device from the elevated, substantially vertical first location with the PFD after the first deployable descent device has been anchored to the elevated, substantially vertical first location.

In some implementations, the PFD may be piloted by a first person during at least some portion of the delivering, anchoring, deploying steps, or combinations thereof. The first person may be riding on, or carried by, the PFD during the delivering, anchoring, and deploying steps. Additionally, the PFD may be piloted via a remote control link by a second person during at least some portion of the anchoring step. The second person may not be riding on and may not be carried by the PFD during the delivering, anchoring, and deploying steps. In some implementations, the first person may perform at least some of the anchoring step manually using their hands while the second person is piloting the PFD.

In some implementations, the PFD may be piloted by a first person during at least some portion of the delivering, anchoring, deploying steps, or combinations thereof. The first person may be riding on, or be carried by, the PFD during the delivering, anchoring, and deploying steps. The PFD may also be equipped with one or more mechanical manipulator arms controllable via a remote control link. The one or more mechanical manipulator arms may be controlled by a second person via the remote control link during at least some portion of the anchoring step, and the second person may control the one or more mechanical manipulator arms to perform at least part of the anchoring step. The second person may not be riding on and may not be carried by the PFD during the delivering, anchoring, and deploying steps.

In some implementations, the one or more mechanical manipulator arms may be multi-degree-of-freedom mechanical manipulator arms.

In another implementation, a system may be provided. The system may include a first deployable descent device, the first deployable descent device having a first end and a second end, and a station-keeping-capable personal flying device (PFD). The PFD may be configured to provide for delivery of the first deployable descent device to an elevated, substantially vertical first location and anchoring of the first end of the first deployable descent device to a feature at the elevated, substantially vertical first location while the first end of the first deployable descent device is supported by the PFD.

In some system implementations, the PFD may be further configured to provide for anchoring of the second end of the first deployable descent device to a second location at a lower altitude than the elevated, substantially vertical first location. The first deployable descent device may also further include a tensioning mechanism configured to induce a tensile load in the first deployable descent device in addition to any tensile load attributable to the weight of the first deployable descent device when the tensioning mechanism is actuated.

In some system implementations, the system may include two or more standoffs configured to offset a substantial portion of the first deployable descent device from a surface when the first deployable descent device is anchored to the elevated, substantially vertical first location and the second location. The surface may be located between the elevated, substantially vertical first location and the second location.

In some implementations, the system may also include a second deployable descent device, the second deployable descent device having a first end and a second end. The PFD may also be further configured to provide for delivery of the second deployable descent device to the second end of the first deployable descent device after the first deployable descent device has been anchored to the elevated, substantially vertical first location and for attaching of the first end of the second deployable descent device to the second end of the first deployable descent device.

In some system implementations, the PFD may be further configured to provide for deployment of the first deployable descent device after the first deployable descent device has been anchored to the elevated, substantially vertical first location. In some system implementations, the PFD may be further configured to retrieve the first deployable descent device after the first deployable descent device has been anchored to the elevated, substantially vertical first location.

In some system implementations, the PFD may be equipped with at least one mechanical manipulator arm. In some further implementations, the at least one mechanical manipulator arm may be a multi-degree-of-freedom mechanical manipulator arm. In yet some further implementations, the at least one mechanical manipulator arm may include a mechanical grasper end effector.

In some system implementations, the PFD may include a remote control link configured for communication with a separate, external remote control station, and the PFD may be configured to be at least partially controlled via commands received via the remote control link.

In some system implementations, the PFD may carry the first deployable descent device on a framework protruding from the front of the PFD. The framework may support the first deployable descent device during anchoring of the first end of the first deployable descent device.

These and other features of the present invention will be presented in more detail in the following detailed description of the invention and the associated figures.

BRIEF DESCRIPTION OF THE DRAWINGS

FIG. 2A illustrates one configuration of a UAV and deployable descent device.

FIG. 2B illustrates a configuration of a UAV featuring a spool-wound deployable descent device.

DETAILED DESCRIPTION

Figure 1A:
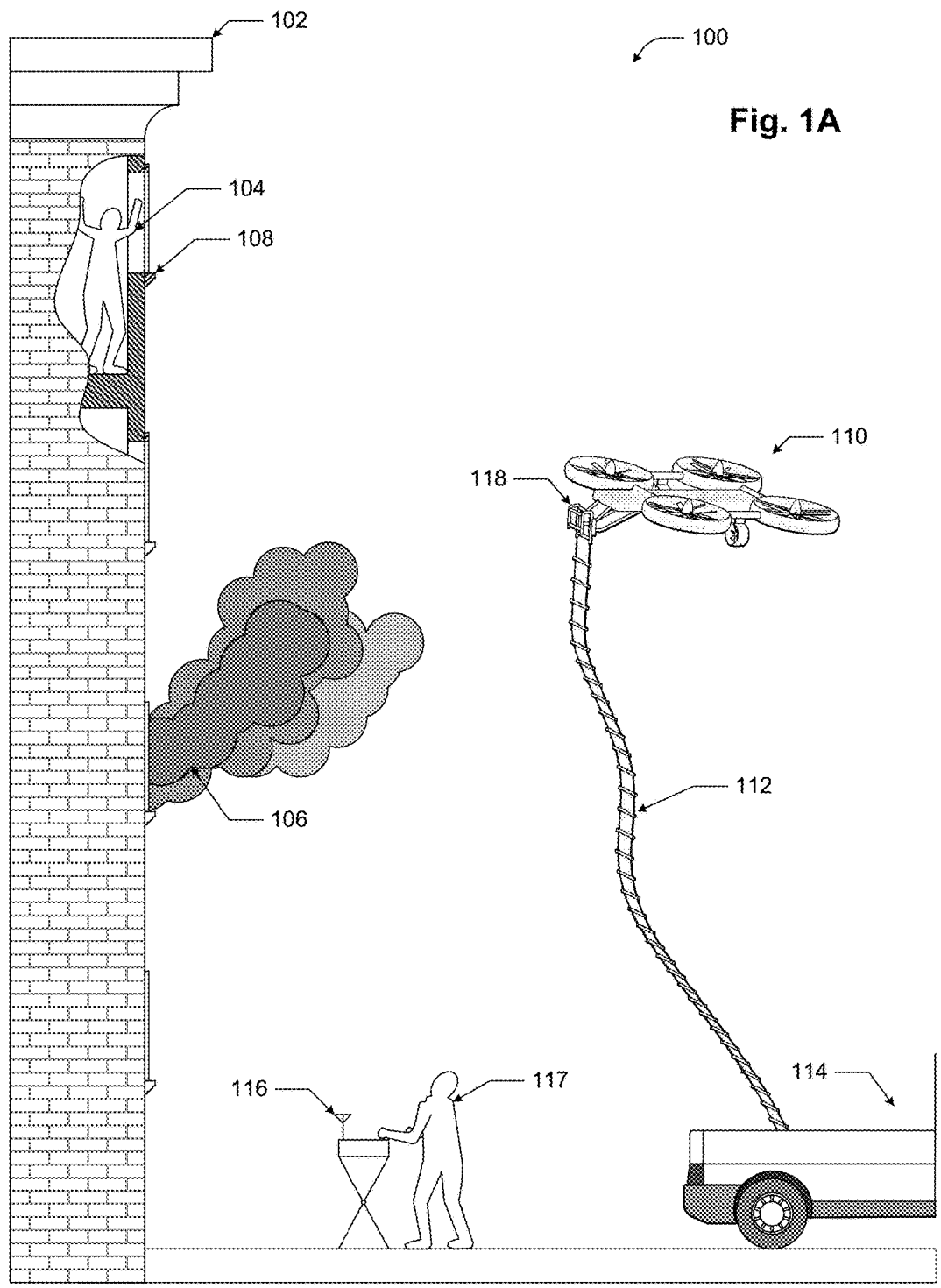
FIG. 1A illustrates a UAV-delivered deployable descent device being delivered by a UAV.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific implementations, it will be understood that it is not intended to limit the invention to the implementations.

For example, the techniques and mechanisms of the present invention will be described in the context of particular multi-story buildings. However, it should be noted that the techniques and mechanisms of the present invention apply to a variety of different structures. In the following description, numerous specific details are set forth in order to provide a thorough understanding of the present invention. Particular example implementations of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some implementations include multiple iterations of a technique or multiple instantiations of a mechanism unless noted otherwise. For example, a system uses an aerial vehicle in a variety of contexts. However, it will be appreciated that a system can use multiple aerial vehicles while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities.

Modern structures such as buildings may consist of multiple stories and may be occupied by many hundreds or, in some cases, thousands of people. Multi-story buildings may be used for commercial or office space, for residential use, or for mixed-use purposes. The typical floor height for such buildings ranges between 3 and 4 meters, and the number of stories in a multi-story building may reach more than 150 floors.

While modern buildings may contain fire suppression systems and may be constructed of fire-resistant structural materials, fire still represents a significant threat to the safety of building occupants. Fires may exceed the fire safety system capacity of a building, may block the egress routes, or may compromise the operation of the fire safety system. Other types of disasters may necessitate the rescue of the occupants of a multi-story building as well, such as hazardous chemical spills, hostage situations, bombings, collapse of an intermediate floor without total building collapse, etc.

Implementations of the present invention may be used in situations where the occupants of a building, structure, or elevated location cannot or will not use the built-in egress routes from a building.

Figure 1B:
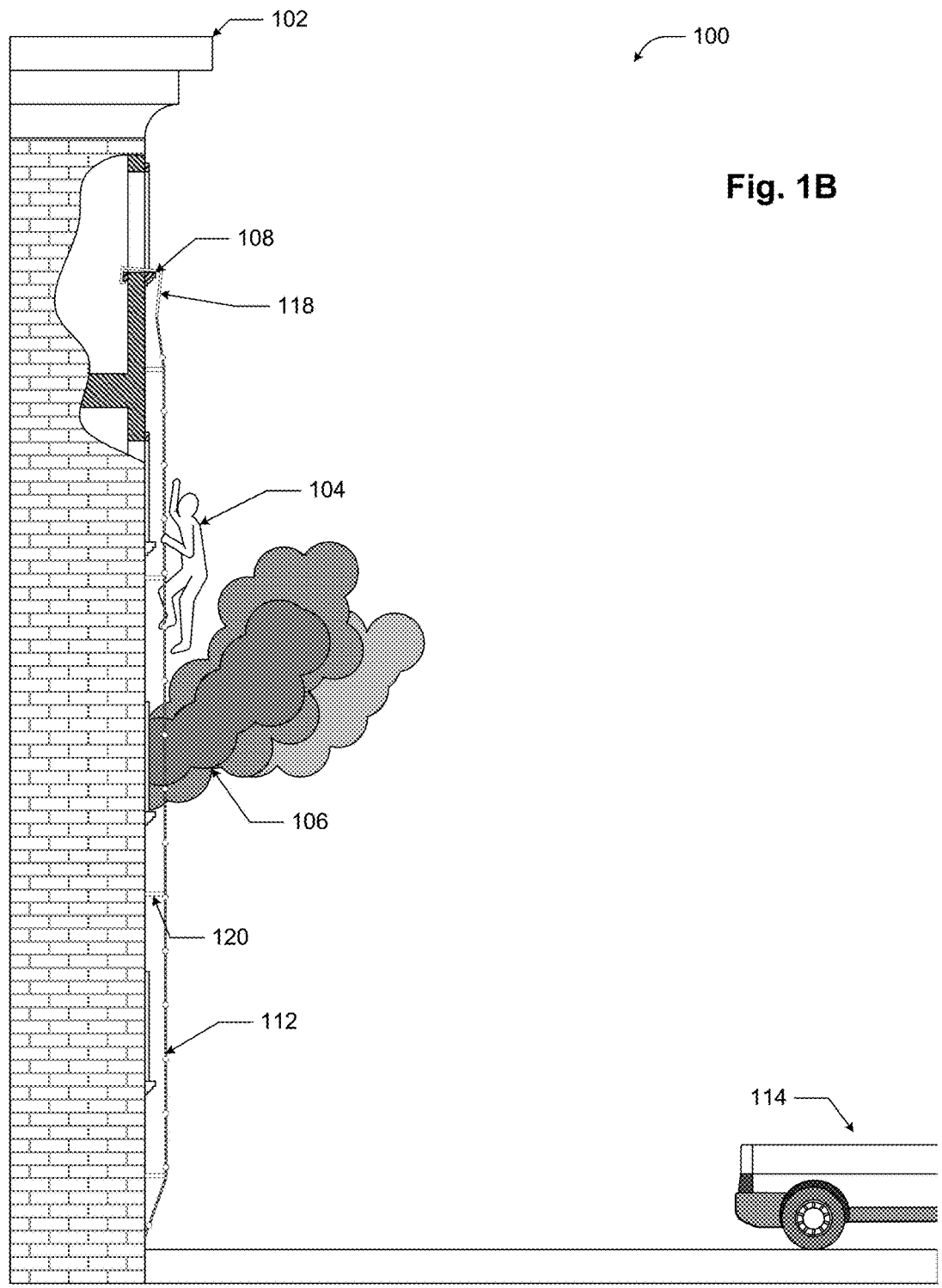
FIG. 1B illustrates a UAV-delivered deployable descent device after deployment.

FIG. 1A illustrates one example technique for using a deployable descent device. Rescue site 100 features building 102, which may be on fire. Rescuee 104 may be trapped in building 102 by fire and smoke 106. Rescue personnel 117 may initiate rescue of rescuee 104 by delivering deployable descent device (hereinafter "D3") 112 to elevated location 108 on building 102 by unmanned aerial vehicle (hereinafter "UAV") 110 controlled by UAV controller 116. According to various implementations, UAV 110 anchors D3 112 to elevated location 108 using anchor device 118 and then deploys D3 112. FIG. 1B depicts rescue site 100 after D3 112 has been anchored and deployed. After anchoring and deployment, D3 112 may be used by rescuee 104 to descend from building 102. UAV 110, D3 112, UAV controller 116, and rescue personnel 117 are not shown in FIG. A2, although they may still be present. UAV 110, D3 112, UAV controller 116, and rescue personnel 117 may all travel to and from rescue site 100 using transport vehicle 114.

Figure 1C:
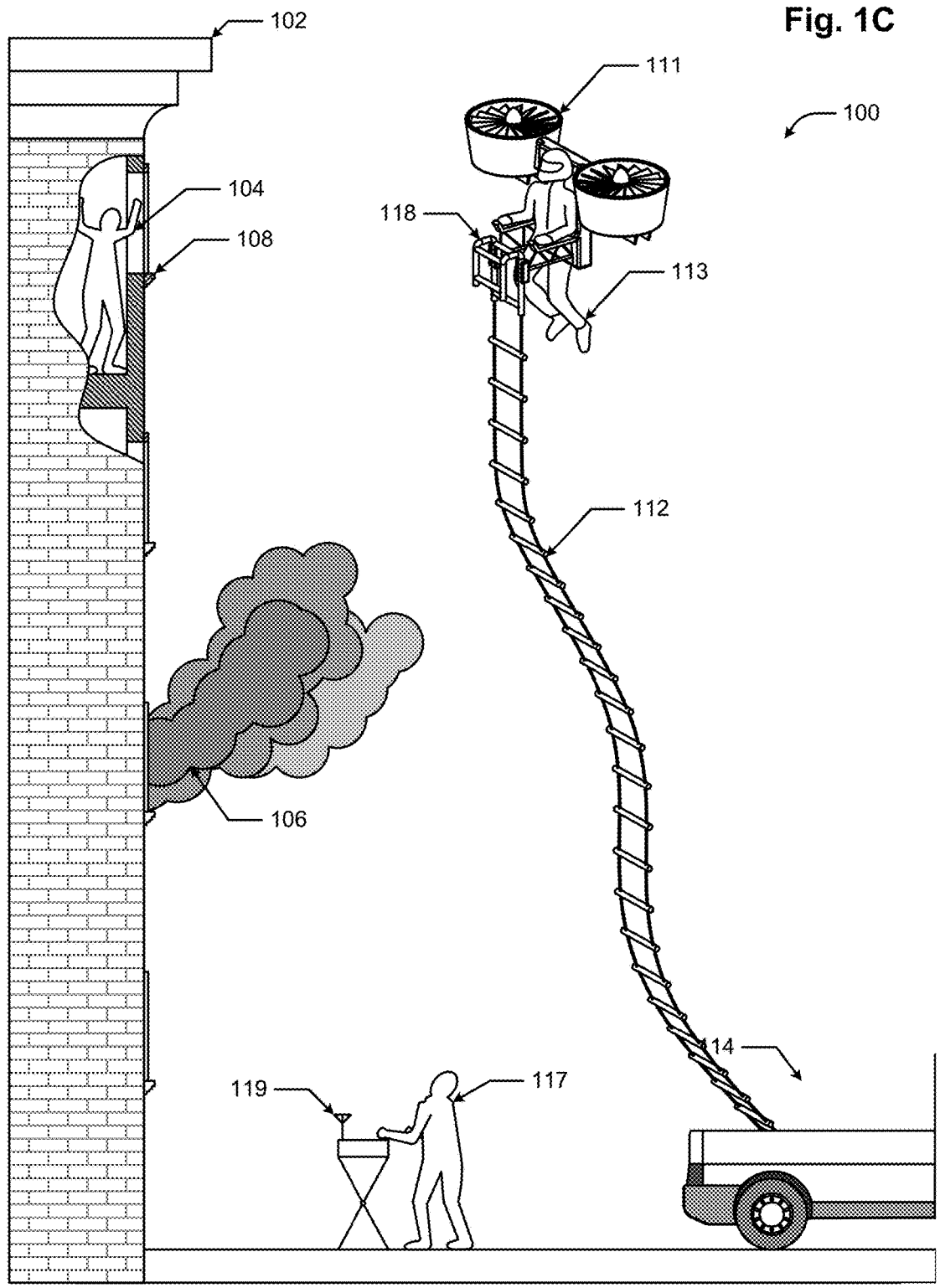
FIG. 1C illustrates a deployable descent device being delivered by a manned personal flying device (PFD).

FIG. 1C illustrates an example of D3 use in which manned personal flying device (PFD) 111 may be used to deliver D3 112. PFD 111 may be piloted by pilot 113, or, in some implementations, may be piloted by ground-based rescue personnel 117 using PFD controller 119. After approaching elevated location 108, PFD 111 may be maneuvered, or tools on PFD 111 utilized, to place anchor device 118 in place at elevated location 108.

Figure 1D:
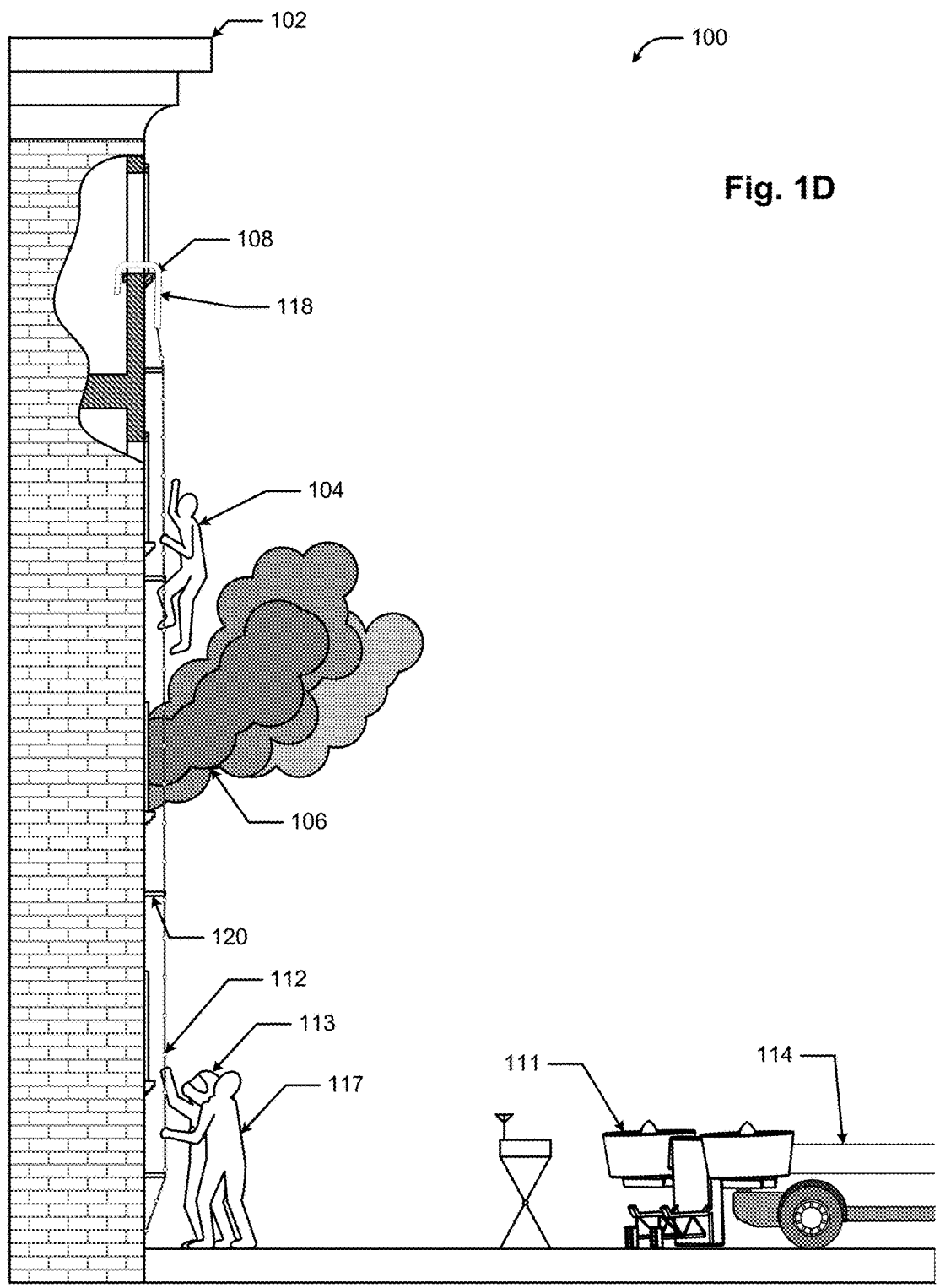
FIG. 1D illustrates a deployable descent device after deployment.

FIG. 1D depicts the D3 of FIG. 1C in a deployed configuration, with rescuee 104 climbing down the exterior of the building. Pilot 113 may have landed PFD 111, and may assist rescue personnel 117 in, for example, steadying D3 112. In some implementations, however, pilot 113 may stay aloft to provide on-site monitoring of elevated location 108, or to place additional D3s.

Various implementations may use a UAV to deliver a deployable descent device (D3), described further in a later section, to an elevated location on a building.

Particular implementations may use a UAV that may be a rotorcraft or other aerial vehicle capable of three-dimensional station-keeping. A rotorcraft (or rotary-wing aircraft) is a heavier-than-air aerial vehicle that derives lift through the rotation of rotor blades. The mast may alternatively be referred to as a shaft. A rotor includes a mast and multiple rotor blades (typically between two and six blades) mounted to the mast. A rotorcraft can use one or more rotors to provide vertical lift and/or horizontal thrust. Rotors on vertical masts and other vertical force generating devices may be referred to herein as lifters.

Rotorcraft may use a rotor capable of both vertical lift and horizontal thrust. For example, a modern helicopter is capable of altering the pitch of each rotor blade individually throughout a rotor rotation. In this way, the rotor may be controlled to differing amounts of lift in different areas of the rotor sweep. For example, a helicopter rotor may develop more lift on the right side of the helicopter than on the left side, causing the helicopter to drift and pitch to the left. The mechanism and controls for implementing a variable-pitch rotor such as those used in helicopters are quite complex. As discussed elsewhere in this paper, open-blade, variable pitch rotorcraft such as helicopters may be unsuited for D3 placement due to the possibility of collision between the rotors and the structure or edifice on which a D3 is being placed.

Various rotorcraft implementations may also include a plurality of rotors with rotor blades of fixed pitch. Such rotorcraft may vary the speed and, consequently, the lift of each rotor to cause such rotorcraft to tilt, yaw, pitch, and drift.

Further implementations of rotorcraft may include rotors on horizontal masts and other horizontal force generating devices, which may be referred to herein as thrusters. Lifters and/or thrusters may include rotors, turbines, rockets, and/or static lifting surfaces. The use of thrusters may allow such rotorcraft to translate and rotate in a horizontal plane without altering the lift supplied by the lifters.

Use of the terms "vertical" and "horizontal" in this context refers to the direction of the generated forces just prior to rotorcraft takeoff. The directions of such thrust with respect to the ground may change over time if the rotorcraft pitches, yaws, or rolls, but for convenience, "vertical" and "horizontal" are used in this document regardless of the orientation of the rotorcraft relative to the ground.

Other implementations may utilize a UAV that derives lift and control from various other mechanisms. For example, the UAV may rely on a compressed air source to provide lift and/or thrust for the UAV. The compressed air source may be located onboard the UAV, such as an onboard compressed air tank or a solid or liquid propellant that is reacted to produce a pressurized gas, similar to a rocket engine. The compressed air source may also be ground-based and supplied to the UAV via a pressurized gas supply line trailing from the UAV. The compressed air may then be channeled through exhaust ports designed to produce lift and/or thrust. Other materials may be used in place of air as well—for example, denser gases or even liquids may provide greater reaction mass and enhanced performance.

Other UAV implementations may utilize a balloon or other lighter-than-air technology to provide lift. Such implementations may require much smaller lifters, or no lifters at all. A balloon UAV implementation may be modified to lift greater loads through adding additional balloons—this may allow a balloon implementation of a UAV to be rapidly configured in the field to lift D3's of various sizes and weights. A balloon UAV implementation may still feature lifters and thrusters to provide fine positional control.

FIG. 2A and FIG. 2B depict an example of a UAV. UAV 210 depicted in FIGS. 2A and 2B is a quad-lifter UAV with two thrusters. Four lifters 220 provide lift, pitch, and roll capabilities to UAV 210; two thrusters 222 provide yaw and horizontal translation capabilities to UAV 210. Such a configuration allows UAV 210 to be precisely controlled and maneuvered, considerably simplifying the deployment of D3 212. In this implementation, UAV 210 features shrouded rotors for additional safety and robustness. UAV flight control and power system 206 may house electronics and power supplies for UAV 210.

FIG. 2A depicts UAV 210 with D3 212 suspended from mechanical interface 226. D3 212 includes anchor device 218 that may mate to mechanical interface 226. In some implementations, mechanical interface 226 may take the form of a relatively static framework, e.g., a truss or other structure that remains essentially fixed with respect to UAV 210, such as that shown in FIG. 2A. Various active features on mechanical interface 226, such as computer- or remote-actuated release latches, pyrotechnic fasteners or frangible nuts, cable cutters/release mechanisms, may be used to secure D3 212 to mechanical interface 226 during delivery to an elevated location and deployment by UAV 210. After D3 212 has been anchored by UAV 210, D3 212 may be released from mechanical interface 226 using these active features. Anchor device 218 or, in some implementations, D3 212, may include interface features designed to mate to mechanical interface 226. Such interface features may be positively engaged by mechanical interface 226 to prevent unintentional release of D3 212. For example, D3 212 may include brackets, holes, pins, or other interface features that mate with corresponding features on mechanical interface 226. By way of further example, anchor device 218 may include one or more threaded holes to allow threaded fasteners located on mechanical interface 226 to thread into anchor device 218. Such threaded fasteners may be used to draw anchor device 218 tight against mechanical interface 226 for delivery and emplacement at an elevated location. After anchor device 218 has been anchored to the elevated location, the threaded fasteners may be decoupled from the threaded holes, e.g., via rotation by a motorized drive on the mechanical interface 226 or through explosive separation (if the threaded fasteners are pyrotechnic fasteners).

For a static framework such as that shown in FIG. 2A, UAV 210 may be used to precisely place anchor device 218 at an elevated location. As such, UAV 210 may perform very minute, precise adjustments with regard to its spatial positioning and orientation. For example, UAV 210 may approach the elevated location, such as a window in the side of a building, with mechanical interface 226 holding D3 212 a short distance in front of UAV 210. UAV 210 may then be directed to move towards the window until anchor device 218 is at a position above the window sill of the window. UAV 210 may then be directed to lower itself and, consequently, anchor device 218, such that anchor device 218 is lowered over the window sill. One portion of anchor device 218 may thus be located on the "inside" of the wall forming the window sill, and another portion of anchor device 218 may be located on the "outside" of the wall forming the window sill. Thus, anchor device 218 may be "hooked" over the window sill, as shown in FIG. 1B. After anchor device 218 has been hooked, UAV 210 may separate itself and mechanical interface 226 from anchor device 218 via, for example, equipment such as that described earlier in this paper.

Mechanical interfaces may also be non-static, e.g., more "active," in nature. For example, a UAV equipped with one or more mechanical arms may be used to place a D3. Such mechanical arms may be simple, e.g., including only one or two degrees of freedom, or complex, e.g., including three or more degrees of freedom. The mechanical arms in such implementations may serve as mechanical interfaces for holding the D3. In some implementations, mechanical arms may be used in addition to a static framework to provide a mechanical interface. For example, the static framework may support the anchor device of the D3 during flight and initial maneuvering at the elevated location, and then the mechanical arms may be used to lift the anchor device from the static framework and move the anchor device to the elevated location. This may allow the UAV to be kept in a relatively motionless state with respect to the elevated location while the mechanical arms are used to move the anchor device to the elevated location and anchor it. Such mechanical arms may, for example, have end effectors with specialized features for interfacing with the anchor device, such as posts with retractable protrusions that are sized to fit within corresponding holes on the anchor device, e.g., similar to quick-release pins. In other implementations, such mechanical arms may be equipped with more general-purpose end effectors, such as mechanical grippers/graspers/claws, that allow the mechanical arm(s) to grasp the D3 or the anchor device and maneuver it into position.

In some implementations, the end effectors may include multiple pieces of equipment. For example, some mechanical arms may be configured not only with a mechanical gripper, but also with a tool such as an explosively-driven, powder-actuated fastener driver. A mechanical arm with such an end effector may be used to precisely position the anchor device against a suitable surface at the elevated location and then drive a fastener through the anchor device and into the surface. For example, if the D3 anchor device includes a swaged or thimble cable end fitting, the end effector may be configured with a mechanical gripper that can be used to grasp the cable end fitting (or the cable near the cable end fitting) and to place the cable end fitting next to a suitable mounting location at the elevated location. The end effector may also include a powder-actuated fastener system that may be aligned with a fastener receptacle hole in the cable end fitting to allow a fastener fired from the powder-actuated fastener system to be driven through the receptacle hole and into the surface, thus affixing the cable end fitting to the surface.

A UAV or PFD may be equipped with one or more mechanical arms. Multiple arms may allow for greater flexibility in D3 placement. For example, a first mechanical arm may be used to position an anchor device at an elevated location, and a second mechanical arm may be used, if necessary, to anchor the anchor device held by the first mechanical arm to the elevated location.

Figure 8A:
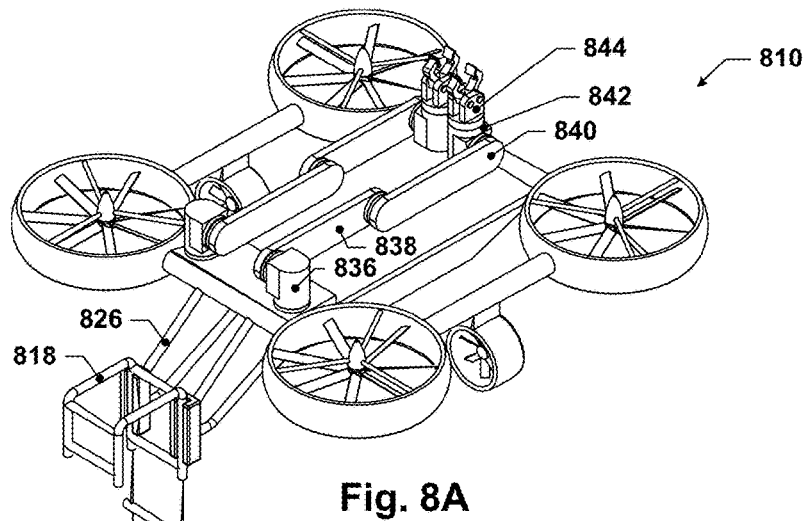
FIG. 8A depicts a conceptual UAV featuring mechanical manipulator arms in a stowed state.
Figure 8B:
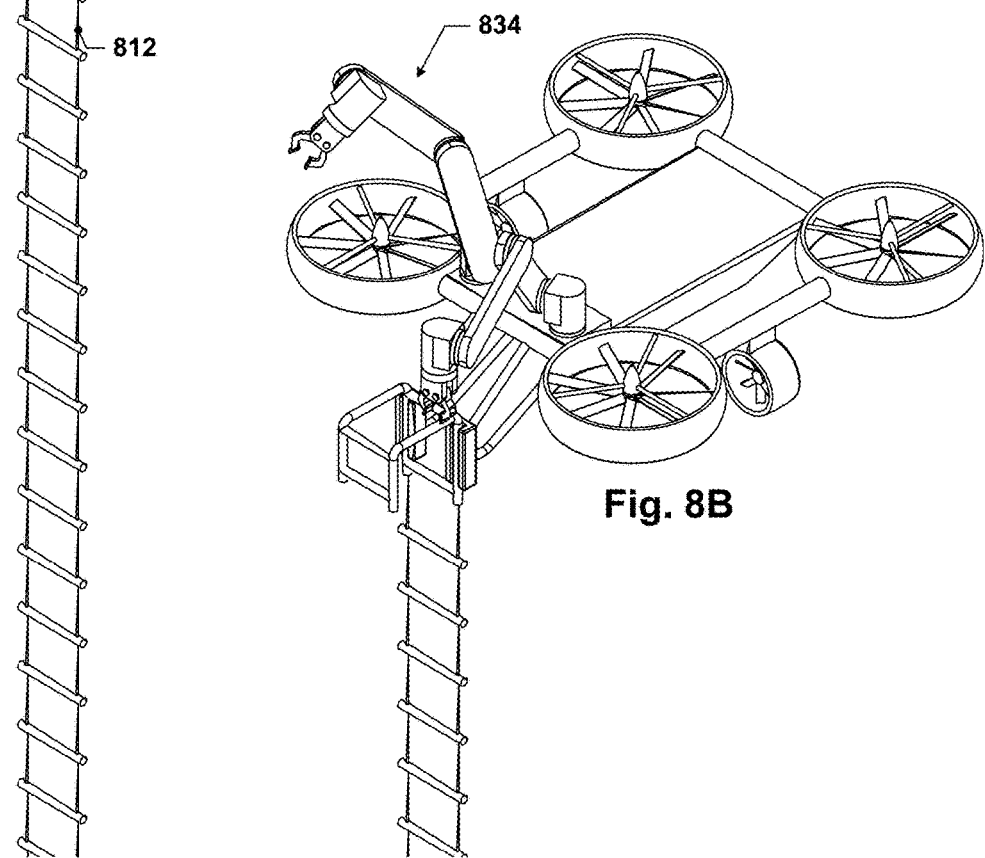
FIG. 8B depicts the conceptual UAV of FIG. 8A with the mechanical manipulator arms in a deployed state.

FIGS. 8A and 8B depict isometric views of a conceptual UAV 810 featuring two mechanical manipulator arms 834. Mechanical manipulator arms 834, in this example, are complex arms, each capable of rotating portions of themselves about 5 separate rotational axes. For example, a mechanical manipulator arm 634 may be connected to a mounting hardpoint on UAV 810 via shoulder 836. Shoulder 836 may be configured to rotate in the yaw direction relative to UAV 810, and may also have a rotational interface with a rotational axis perpendicular to the yaw axis that links shoulder 836 to one end of upper arm 838. Upper arm 838 may, in turn, have a rotational interface with a rotational axis perpendicular to the yaw axis that links the other end of upper arm 838 to one end of lower arm 840. Lower arm 840 may also have a rotational interface with a rotational axis perpendicular to the yaw axis that links the other end of lower arm 840 to a wrist unit 842. Wrist unit 842, in turn, may have a fifth rotational interface that links wrist unit 842 to end effector 844. The fifth rotational interface may have an axis of rotation that is perpendicular to the rotational axes of the lower arm rotational interface axes. The mechanical manipulator arms may be driven by a variety of actuators, including, for example, servo or stepper motors controlled by a mechanical manipulator arm control system. The control system may, for example, include a wireless link to a remote control device that may be used to provide input that guides the movement of the mechanical manipulator arms.

For storage and flight, mechanical manipulator arms 834 may be placed into a "stowed" state, e.g., snugged against the body of UAV 810 as shown in FIG. 8A, or otherwise stored so as to reduce the chance of snagging mechanical manipulator arms 834 on an obstacle while flying. After UAV 810 arrives at a desired anchoring location for anchor device 818 (or other location where the use of a mechanical manipulator arm may be required), mechanical manipulator arms 834 may be deployed, as shown in FIG. 8B.

In some implementations, mechanical manipulator arms 834 may be used in conjunction with a static-framework mechanical interface 826. Mechanical interface 826 may be used to hold anchor device 818 during flight and mechanical manipulator arms 834 may then grasp anchor device 818, lift anchor device 818 (and deployable descent device 812 as a whole) clear of mechanical interface 826 for placement at an anchoring site. In some implementations, however, mechanical manipulator arms may simply serve as the mechanical interface, carrying the anchor device during flight and anchoring the anchor device at the anchoring site.

It is to be understood that a similar use of mechanical manipulator arms may be made in various PFD implementations as well. Such mechanical manipulator arms may be controlled by a human riding, or carried by, the PFD or by ground personnel via a remote control at a ground station. Mechanical manipulator arms may also be simpler than those shown in FIGS. 8A and 8B. For example, mechanical manipulator arms may feature fewer degrees of freedom than the mechanical manipulator arms shown in FIGS. 8A and 8B.

Mechanical interface 226 may release D3 212 after D3 212 has been delivered to the target site and anchored. Other anchor devices may be used in addition or alternatively to anchor device 218. D3 212, which is depicted as a rope ladder in FIG. 2A, trails below UAV 210 as UAV 210 ascends to an elevated anchor location. Such a configuration may be straightforward and requires minimal integration with UAV 210. However, trailing D3 212 may snag on obstructions, snarl itself, or act as a drogue device that interferes with control of UAV 210.

FIG. 2B depicts UAV 210 with D3 212 wound around deployment spool 228. Such a configuration may be used to alleviate some of the issues noted above with respect to free-hanging D3 212 as shown in FIG. 2A. D3 212 may be wound around deployment spool 228 for storage. Deployment spool 228 may be provided as a "cartridge" that may be installed into a receptacle on UAV 210 for delivery to the elevated anchor point. A cartridge-based D3 212 allows for rescue personnel to rapidly equip UAV 210 for a rescue attempt compared to a free-hanging D3 212 that may require rescue personnel to monitor D3 212 for tangles or other issues affecting deployment. After anchoring D3 212, UAV 210 may fly away from the anchor point, spooling out D3 212 from deployment spool 228 along the way. Alternatively, UAV 210 may be configured to release deployment spool 228 after anchor device 218 has been attached to the anchor point. Deployment spool 228 may then self-unwind under its own weight.

According to various implementations, a UAV may be equipped to deliver the D3 to an elevated location, such as a window or other access point, on a building. To facilitate delivery of the D3, the UAV may include a mechanical interface, such as mechanical interface 226 in FIGS. 2A and 2B, that allows the UAV to carry the D3. The mechanical interface may be configured to release the D3 after the D3 has been anchored to the elevated anchor point. The UAV may automatically release the D3 when the D3 is anchored, or the D3 may be released in response to a remote command from a human controller. However, release of the D3 may not be not required—the UAV may also remain connected with the D3 after anchoring if desired.

According to various implementations, the UAV may be equipped with a releasable anchor device that allows the UAV to then perform other tasks after anchoring is complete. A releasable anchor device may also be less likely to obstruct rescuees from using the D3. For example, a UAV may be equipped with a separate anchor-delivery device that may be used to install an anchor device prior to delivery and installation of the D3. One UAV may be equipped with the anchor-delivery device, and another UAV may be equipped with a mechanical interface configured to deliver the D3. The anchor delivery UAV may carry an anchor device, such as a J-hook or other suitable anchoring technology, to the elevated location and install it. The D3 UAV may then deliver the D3 to the installed anchor device and connect the D3 to the anchor device using techniques such as those discussed elsewhere in this document, e.g., through the use of a mechanical arm or quick-attachment features. This may be done to allow a heavier-duty (and heavier weight) anchor device to be used than could be used if payload weight needed to be split between the anchor device and the D3. A single UAV may also be equipped to perform both tasks, or reconfigured with the mechanical interface for D3 delivery after delivering the anchor device(s) with an anchor-delivery device.

The UAV may also feature additional equipment to facilitate rescue operations. For example, a UAV may have conventional tools, such as drills, saws, spring-loaded punches, and explosive powder-actuated fastener systems. Further implementations may feature UAVs equipped with more specialized equipment, such as shaped charges, piton guns, pneumatic hammers and nail drivers, and mechanical graspers. UAVs may also be equipped with ancillary equipment such as local-area fire suppression devices, public-address or readerboard devices for communicating to rescuees, two-way communications systems, and other equipment that may facilitate communication with or protection of rescuees in elevated locations. Such tools may be located on one UAV, distributed across several UAVs, or be configured to be interchanged on a UAV. For example, particular implementations may include using two UAVs, one of which is equipped to deliver, anchor, and deploy the D3, and the other of which is equipped with a spring-loaded punch that may be used to break a tempered glass window at the elevated location and a public address system or readerboard for indicating to rescuees when it is safe for them to descend using the D3.

The use of a UAV and deployable descent device provides a number of benefits. For example, hook-and-ladder trucks are used by fire departments to access multi-story buildings, but are limited in terms of the height to which they may extend their ladders. Hook-and-ladder trucks must also be maneuvered close enough to the building to bring the ladder within reach of the building walls. This is not always feasible. For example, the building in question may not be accessible to road vehicles. This may occur due to rubble or other obstructions that may often be present if the emergency involves a natural disaster or other cause of widespread destruction. Buildings may also be inaccessible to road vehicles due to their construction; for example, a 10-story building may include a lobby level with a significantly large footprint than the remaining stories. The lobby may prevent a road vehicle from approaching close enough to the remaining stories to rescue people trapped in those stories. In many cases, rescuees may simply be located on a side of the building not adjacent to a road.

By contrast, UAVs are capable of flying to significant heights and are more than capable of exceeding the height limitations of a hook-and-ladder truck. UAVs are also capable of flying over obstacles that would block a road vehicle.

UAVs have typically been used for military reconnaissance and precision weapon delivery. Most military UAVs are fixed-wing craft and are incapable of three-dimensional station-keeping due to an inherent inability to hover. Newer military UAVs feature the ability to hover to enable them to be operated in terrain that might not be conducive to fixed-wing UAV use, such as canyons and dense urban areas.

The use of a UAV with three-dimensional station-keeping capability in various implementations allows rescuers better access to structures in which rescuees might be present. According to various implementations, UAVs have features that allow operation in close proximity to buildings. Features may include stability control, enclosed rotor blades, small size, etc. UAVs may approach close enough to a building to interact with the building, anchor a D3, and perform other rescue tasks. In some implementations, the UAV may be small enough to enter a building.

For example, a conventional, manned helicopter such as a Sikorsky UH-60L has a fuselage width of 7 ft 9 in and a rotor sweep of 53 ft 8 in. Because of the fact that the rotors of a UH-60L extend beyond the fuselage by approximately 23 feet, the UH-60L is prevented from getting closer than 23 feet to the side of a building—without factoring in any margin for safety. Additionally, the use of a manned rescue helicopter in such close proximity to a building and the often-capricious wind patterns of urban canyons places the helicopter, its crew, the building, and any rescuees in the vicinity at tremendous risk. Finally, helicopters and helicopter crews are tremendously expensive to own and operate—the UH-60L, for example, has an acquisition cost of about $6 million dollars.

By contrast, a UAV such as that shown in FIGS. 2A and 2B may approach the side of a building and even touch the side of the building without risking catastrophic collision. This may allow the UAV, and other UAVs with similar capabilities, to precisely deliver and place an anchor device/D3 at a location on the side of the building, such as a window sill, window frame, or other feature on a substantially vertical surface of the building. A UAV may even perform such tasks when rescuees are in the immediate vicinity of the anchor device placement site without substantial risk to the rescuees. Due to the UAV's close proximity to the anchor device/D3 placement site, the UAV may also provide ground operators with detailed, real-time feedback, e.g., via video, of the placement operation that allows for operator review of the anchor device placement. Such review may be useful in evaluating whether or not the anchor device is correctly installed at the anchor site, or whether there are any potential hazards that might later interfere with use of the D3. Such feedback may be of a much higher quality than may be provided by a remote observer, e.g., a ground- or helicopter-based observer, since the UAV is actually at the anchor site.

Using a UAV avoids many of the shortcomings of manned aerial vehicles. For example, UAVs are, by definition, unmanned. A UAV may operate completely autonomously or in conjunction with a remote human pilot. In either case, there is an extremely low chance that people will be injured in the event of a UAV crash because the UAV does not carry any passengers; the only UAV failure mode that is likely to result in injury to a human would be if the UAV fell on or collided with a human.

UAVs may also be significantly smaller and lighter than manned aerial vehicles; this is due to the simple fact that UAVs do not need to transport human beings and are not required to include the same safety margins as human-piloted aerial vehicles. For example, an aerial vehicle with a human on board typically requires increased power for emergency situations, increased fuel reserves, restraints and seats for the human occupants, environmental controls, enhanced safety systems, etc. All of these requirements add to the size and weight of the aerial vehicle, reduce maneuverability, and add to cost. UAVs, by contrast, do not require nearly as much hardware. UAVs may therefore be constructed to a much less exacting design standard and may be significantly smaller than manned aerial vehicles.

Nonetheless, in some implementations, a suitable manned vehicle may be used in place of a UAV. For example, a personal flying device (PFD) capable of station-keeping flight, may be used to lift a D3 to an elevated location on a building or other structure from which the D3 will be deployed. Such implementations may allow for finer control of the D3 deployment operation since the PFD pilot's perception of the elevated location, PFD positioning with respect to the elevated location, and D3 deployment status may be unhindered by the limitations of being forced to view the elevated location from afar or via telepresence, as a UAV operator would likely be forced to do. PFDs are typically intended to be single-person vehicles.

Personal flying devices may be particularly suitable for D3 deployment due to their small size, low cost, and relative ease of piloting. One type of personal flying device that may be used in certain circumstances is a tethered reaction-mass (TRM) PFD. TRM PFDs may generate vertical thrust by rapidly expelling a reaction mass from jets or nozzles on the backpack—in principle, this is how rocket engines operate, usually by expelling propulsion gas generated on-board the vehicle at extremely high velocity. Rocket engines are typically time-limited since the fuel that powers them is often carried on board the rocket-powered vehicle and is limited by the payload/thrust capacity of the vehicle.

A TRM PFD, however, splits the reaction mass source and powerplant from the PFD and transmits the reaction mass from the reaction mass source to the PFD via a tether. The reaction mass source and powerplant remain ground-based, while the PFD experiences tethered flight. For example, MS Watersports GmbH produces a commercially-available TRM PFD, called the Jetlev-Flyer, for recreational use. The Jetlev-Flyer features a PFD and a floating powerplant. The floating powerplant includes a gasoline-driven engine connected to a high-speed water pump and is similar in size to a modern personal watercraft, e.g., a JetSki. A heavy duty, large diameter hose approximately 30-40 ft in length tethers the powerplant to the PFD. An effectively infinite amount of reaction mass, e.g., water, is available to the powerplant since water may be drawn into the powerplant from the body of water on which the powerplant floats, similar in principle to how a personal watercraft works. The water may be pumped into the tether hose and into the PFD. The PFD may then redirect the water such that the water is expelled towards the ground when a person is wearing the PFD. The released water/reaction mass causes the PFD, and items attached to it such as a pilot, to rise a significant distance from the ground.

While the Jetlev-Flyer is obviously limited in maximum height by the length of the tether and requires that it be flown over a body of water to provide a source of reaction mass, other TRM PFDs may be designed that have much greater operational capacity. For example, using a higher-capacity pump and higher water pressures may allow for a smaller, lighter, and longer hose to be used as the tether, which may translate into a higher service ceiling for the PFD.

As mentioned, water-based TRM PFDs such as the Jetlev-Flyer require operation over (or in very close proximity to) a body of water that serves as a source of reaction mass. In metropolitan areas, however, it is unlikely that a body of water will exist near a building requiring the placement and deployment of a D3. In such situations, the powerplant of a TRM PFD may be connected to a high-capacity municipal water supply, such as a fire hydrant. In some implementations, the powerplant may take the form of a fire engine or firetruck with an on-board pump that draws water from a fire hydrant or other nearby water supply, such as water tanks within the fire engine, a nearby water tank, or a nearby body of water.

Another type of personal flying device that may be suitable for use in D3 deployment techniques is a non-tethered (NT) PFD. An NT PFD may carry its own source of reaction mass, or may utilize, for example, turbines or other thrust-generating devices to generate vertical thrust. For example, the Martin PFD, under development by the Martin Aircraft Company, is a personal flying device featuring two ducted fans driven by a gas-powered engine. While an NT PFD's maximum time aloft is limited by the fact that it must carry its own fuel supply, NT PFDs offer numerous advantages over TRM PFDs. For example, the lift capacity of a TRM PFD decreases significantly with altitude since every foot gained in altitude requires that an additional foot or more of reaction mass-containing tether hose be lifted as well. Thus, every foot of altitude eats into the maximum payload budget for a TRM PFD. In contrast, an NT PFD's weight does not increase with altitude. NT PFDs may therefore reach considerably higher service ceilings, e.g., hundreds of feet, than TRM PFDs.

While personal flying devices are typically designed for single-person, manned flight, such devices may also be designed to allow for remote-controlled, unmanned flight. For example, the Martin PFD discussed above may include a remote control capability that allows the PFD to be flown as a remote-piloted vehicle, in which case the PFD may be thought of as a form of UAV or even a remote-controlled, piloted aerial vehicle. However, such remote-control systems may also be used during manned PFD flight. For example, a PFD pilot may be provided additional operational support in the form of a backup, ground-based reserve pilot. If the PFD pilot is confronted with a need to perform an aerial task that does not allow for the PFD pilot to continue piloting the PFD, the PFD pilot may request that the reserve pilot take over piloting of the PFD via the remote control link. Once the reserve pilot has taken over piloting of the PFD, the PFD pilot is free to concentrate on performing the aerial task without distraction due to piloting concerns.

For example, upon arrival at an elevated location at which a D3 is to be deployed, the PFD pilot may find it necessary to perform some manual tasks involved with securing D3 anchors or otherwise installing the D3 at the elevated location. During this time, the reserve pilot may pilot the PFD, allowing the PFD pilot to focus on tasks other than piloting. For example, in a multi-stage D3 implementation, the PFD pilot may need to clip a new D3 stage to a previously-installed D3 stage. This may, for example, involve clipping carabineers connected to the ends of risers of one D3 stage through eyelets on the ends of risers on the other D3 stage. Such a team-based approach provides flexibility not available in single-pilot personal flying device implementations or in the un-piloted UAV implementations of the D3 system discussed above.

Implementations utilizing PFDs instead of, or in addition to, UAVs to deliver D3s may also include various systems similar to those found in UAV implementations. For example, a PFD may be equipped with a mechanical arm or other manipulator to facilitate placement of D3 anchors, standoffs, and segments. The mechanical arm/manipulator may be controllable by the pilot or, in some implementations, by a remote operator. In some implementations, a mechanical arm may not be needed since the pilot of the PFD may be able to use their own arms and hands to manipulate various D3 components. For example, the pilot of the PFD may be able to reach out with one of their hands and grab the free end of a previously-placed D3 and connect it, via a carabineer, to a second D3 carried by the PFD. Such activities may, in some cases, require that the PFD be put into an autopilot mode, e.g., station-keeping hover, or flown by a ground-based operator via a remote control link in order to allow the pilot to concentrate on connecting the D3s.

Figure 2C:
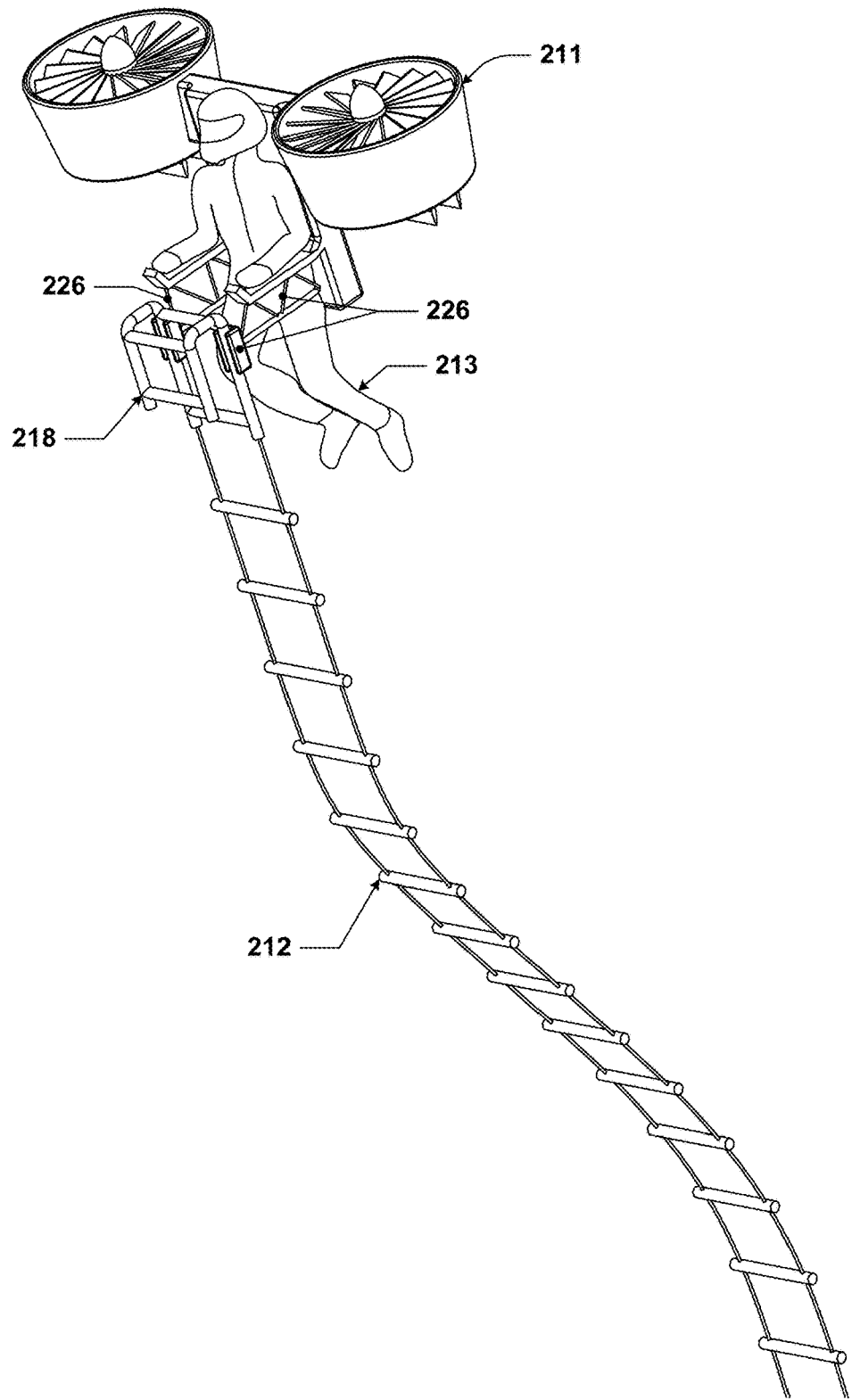
FIG. 2C illustrates a PFD configured to deliver a deployable descent device.

As can be seen in FIG. 2C, PFD 211 may be equipped with a mechanical interface 226 similar to that used for UAV implementations in order to carry D3 212 and anchor device 218 to an elevated location. Other features similar to those discussed herein with respect to UAV implementations may be included in a PFD implementation as well. However, such implementations may be considerably simpler than those used in pure UAVs since pilot 213 of the PFD may be relied on to control various tools, removing the need to control such tools remotely. PFD implementations may still, however, include remote control systems for such tools to allow a remote operator to control them if need be, although this is not required.

Due to the small size of UAVs and PFDs, a transport vehicle, or base station, may transport the UAV or PFD to the general vicinity of the rescue site. The transport vehicle may be a truck or trailer, although other vehicles might be used as well depending on the size of the UAV or PFD, the nature of the anticipated terrain, and vehicle availability. The transport vehicle may also transport the D3 and other associated hardware, such as spare fuel or batteries, charging stations, controllers, anchors, standoffs, tensioning devices, spare parts, and/or spare UAVs/PFDs. The transport vehicle may also include medical equipment for providing first aid to rescuees. Some implementations may feature a purpose-built vehicle that incorporates transport, control, storage, and fueling capabilities for the UAV/PFD and D3.

In some implementations, the UAV may actually be transported by a human operator in a backpack. For example, while the present invention has been discussed in the context of rescuing people from distressed buildings, there may be situations in which implementations of the present invention may be used to rescue, for example, stranded rock climbers. In such scenarios, the rescuees may be located a considerable distance from any location accessible to a road vehicle and the UAV may need to be transported from the nearest road-accessible location to the rescue site by a human porter. Such implementations may utilize a smaller UAV than would be used in urban rescue situations and a lighter-duty D3 to reduce backpack weight. While most PFDs would be too bulky and heavy to be carried by a human, PFDs may also simply be flown by a human pilot to the rescue site.

Various implementations may utilize any of several varieties of D3. While D3 is used to refer to a "deployable descent device" in this paper, it should be understood that this name refers to the primary purpose of such devices—to allow rescuees to descend from an elevated location. However, it may also be possible for personnel to ascend a deployed D3 to reach stranded rescuees. This may be necessary, for example, when a rescuee is injured and unable to self-rescue using the D3. In some implementations, the system may be used even when there are no rescuees. For example, disaster response personnel may simply use a deployed D3 to access otherwise-inaccessible locations in order to perform duties other than rescue, such as firefighting. The use of "deployable descent device" in this application should not be read as limiting the invention to only cover devices that provide descent-only capabilities, but should be read as including devices that allow for both ascent and descent.

One variety of D3 suitable for use in particular implementations is a cable ladder. Ladders feature a series of horizontal steps, called rungs, that are supported by one or more vertical supports, called risers. A cable, or rope, ladder typically features flexible risers made of cable, rope, or webbing that support rungs made of a rigid or flexible material.

A cable ladder D3 may utilize a non-metallic woven material for the risers. Modern woven materials can exhibit tremendous strength in combination with extremely light weight. For example, polyester ropes with maximum tensile breaking strengths of over 9000 lbs are commonly available and weigh less than 8 lbs per 100 ft.

A cable ladder D3 may alternatively utilize metallic woven material for the risers, such as stainless steel cable. 304 stainless steel cable, for example, is available in a 5/32" diameter with a minimum tensile breaking strength of 2400 lbs and a weight of 4.5 lbs per 100 ft. While steel cable, in general, weighs more per foot than many synthetic ropes of equivalent strength, steel has the added advantage of being more tolerant of abuse, including exposure to flames or high heat and abrasive or sharp edges. Lightweight cable ladders utilizing steel cable risers may weigh as little as 3.25 lbs for a 32 ft long ladder and feature cables with tensile breaking strengths in excess of 1300 lbs.

The rungs for a D3 cable ladder may be made from rigid or non-rigid materials. For example, the rungs may be made from aluminum, carbon-fiber, or other lightweight, rigid materials. The rungs may be solid, although rungs with hollow cross sections can be used in order to reduce weight of the D3. The rungs may also be hollow but filled with a secondary material, such as a rigid, lightweight foam, to provide additional strength and rigidity. The rungs for a D3 cable ladder may also be made of a flexible material. Because flexible material rungs are non-rigid, they may collapse under gravitational loading and be difficult for unskilled users, i.e., rescuees, to use. Methods and equipment for preventing flexible rung collapse are detailed later in this paper.

Another variety of D3 suitable for use with particular implementations is a rigid ladder. A rigid ladder may be less daunting to rescuees due to the average person's familiarity with rigid ladders, such as household stepladders and extension ladders, and rescuees may be less hesitant to use them. Rigid ladders are also less likely to shift and sway than cable ladders. Rigid ladder D3s may be manufactured from lightweight, rigid materials, such as thin-wall steel, aluminum, or carbon fiber tube sections.

The rigid ladder may be provided as a plurality of modular sections, each section configured to connect to adjacent sections to form a continuous chain of ladder sections. The connections between the ladder sections may be rigid or may permit the ladders to move relative to each other, similar to links in a chain. The connection mechanism may be toolless and configured to allow the UAV, or a PFD or PFD operator, to connect a ladder section to a ladder section that is already suspended from the anchor location. The sectional ladder approach may also be used to extend cable ladders. For example, two rigid ladders or cable ladders may be connected together through the use of carabineers or other connection means. As mentioned previously, the UAV of PFD may be equipped with mechanical graspers or other equipment to facilitate rescue operations that may be used to implement such connections. For example, the UAV or PFD may be equipped with a mechanical arm and grasper that may be used to grasp the lower end of a previously-installed D3, and the mechanical arm and grasper may then be used to maneuver the grasped lower end of the D3 to engage the lower end of the D3 with a connection device on the upper end of a second D3 carried by the UAV or the PFD. For example, if the upper end or ends of a D3 carried by a mechanical-arm-equipped UAV or PFD are equipped with carabineer-type attachment devices or other spring-loaded catches, the upper end or ends of the D3 may be positioned in a fixed location relative to the UAV or PFD via a static framework that is part of the mechanical interface. The mechanical arms may be used to grasp the free, bottom end or ends of a previously-installed D3 and to force a loop, swaged fitting, or other feature on the bottom end or ends into the carabineer-type attachment device, thus connecting the two D3 segments together.

Other descent technologies may be utilized aside from ladders. For example, D3 may consist of a zipline or other cable-pulley arrangement. A zipline may be delivered to the anchor point and anchored by the UAV or PFD. The UAV or PFD may then be used to deliver zipline trolleys to rescuees, who may then use the trolleys to descend from the elevated location.

The D3 may be anchored, in some manner, to, or near to, an elevated location from which rescuees are to be rescued. To facilitate anchoring, the D3 may be associated with any of a variety of anchoring devices. For example, the D3 may be configured to connect to a J-style hook, such as that represented by anchor 218 in FIGS. 2A and 2B. Such an anchor may include features designed to connect to a mechanical interface, such as mechanical interface 226, on the UAV or PFD as well.

Figure 3A:
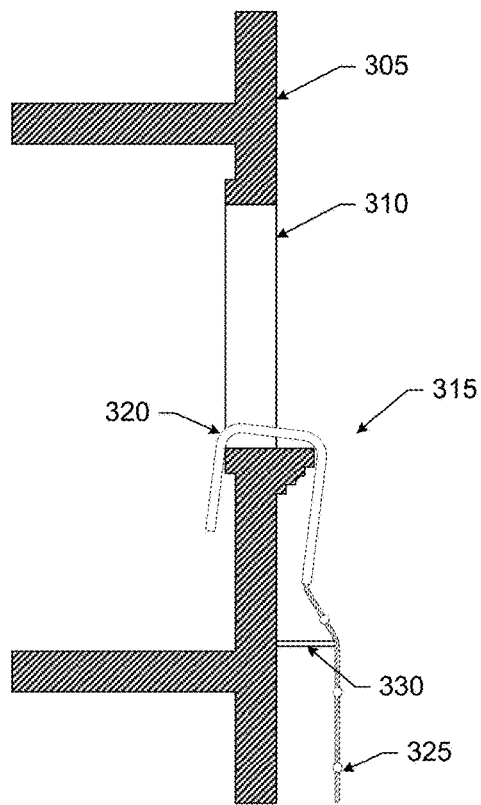
FIGS. 3A-3D illustrate various anchor technologies that may be used in some implementations.

J-hook 320 may be delivered by the UAV or PFD to elevated location 315 on building 305 and placed over a window 310 sill, parapet, railing, or other such feature, as shown in FIG. 3A. Like-numbered items in FIGS. 3A-3D refer to like structures. Once released, J-hook 320 grapples anchor location 315 and may support attached D3 325. Standoff 330 may be used to prevent D3 325 from contacting the side of building 305, as detailed later in this paper. The placement of the J-hook may be performed by the UAV or the PFD, either under direct manual control, remote manual control, or under local autonomous control. A quadlifter UAV, as discussed earlier, may be particularly well-suited to such placement maneuvers due to the degree of control it affords the operator. A PFD such as the Martin PFD may also be very suitable due to the ability of a PFD to approach very close to a building and place J-hook 320. Alternatively, the UAV may deliver the D3 to a human, such as a rescuee, near the anchor point and rely on the human to anchor the D3 to a suitable feature with the anchor device. The human may be instructed on the proper method for installing the anchor via any number of means, including written instructions, audio instructions via cell phone or UAV public address system, or video instructions displayed on a display carried by the UAV. Live feedback may be provided to a human anchor installer by the UAV controller, who may observe the progress of the human anchor installer using cameras mounted on the UAV.

Figure 3B:
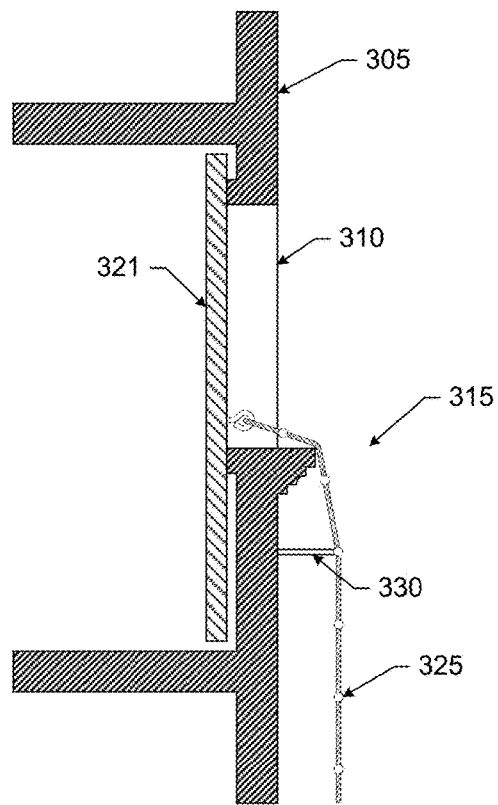

FIG. 3B illustrates a deployable crossbar anchor device 321. A UAV or a PFD equipped with a crossbar anchor device 321 would deliver the crossbar anchor device 321 to a suitable anchor point, such as a window 310 or door opening. Crossbar anchor device 321 may feature a major dimension larger than the width and/or height of the anchor point opening, but would feature minor dimensions considerably smaller than the opening dimensions. During crossbar anchor device 321 delivery, the UAV or PFD may rotate and translate crossbar anchor device 321, e.g., using a mechanical arm/manipulator, such that crossbar anchor device 321 passes through the opening, i.e., such that the major axis of the crossbar anchor device 321 is approximately parallel to the direction of translation through the opening. After crossbar anchor device 321 has passed through the opening, the UAV may rotate crossbar anchor device 321 such that the major axis spans the opening. D3 325 attached to a crossbar anchor device 321 installed in this manner will pull crossbar anchor device 321 against the edges of the opening when tensioned. Crossbar anchor device 321 may be useful when there is no lip or wall from which a J-hook may be hung or where the structural integrity of such a lip or wall is suspect.

Figure 3C:
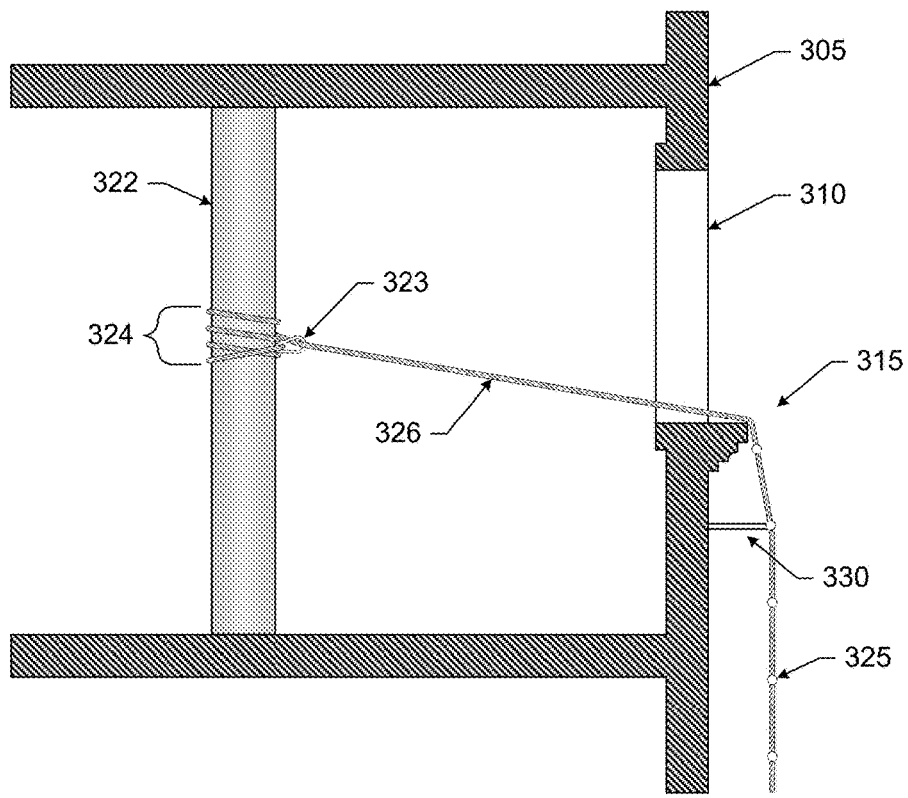

Particular implementations may rely on an internal building structure, such as a support column, to provide an anchor point, such as shown in FIG. 3C. In such implementations, the UAV may be designed with a form factor conducive to navigating the internal structure of building 305 and may include features to prevent collisions with internal structures, such as shrouded rotors, and be equipped to break windows or other frangible obstacles within a building. The UAV may navigate to an elevated access point in the building, fly into the building through window 310, and locate an appropriate support structure 322, such as a building column or an elevator shaft. The UAV may then circle support structure 322 while paying out tether 326; after making one or more circuits around the support structure, the UAV may then attach the end of the tether to another location on the tether with, for example, carabineer 323, forming loop or noose 324 about the support structure. Alternatively, the UAV may attach the end of tether 326 to a point in the interior of building 305 and then fly around support structure 322, effectively wrapping tether 326 about support structure 322 one or more times. Such a configuration benefits from the friction between wrapped tether 326 and support structure 322, that can be used to support suspended D3 325 after D3 325 deployment. Due to the larger size of PFDs, such techniques may not be as feasible using a PFD. However, in some implementations, a PFD may be flown into a building by the pilot to effect anchoring of the D3. In such implementations, the pilot may be able to land the PFD within the building, climb out, and manually secure the D3 to an anchor point. The pilot may then strap themselves back into the PFD and fly out of the building, or utilize the D3 to descend from the building.

Figure 3D:
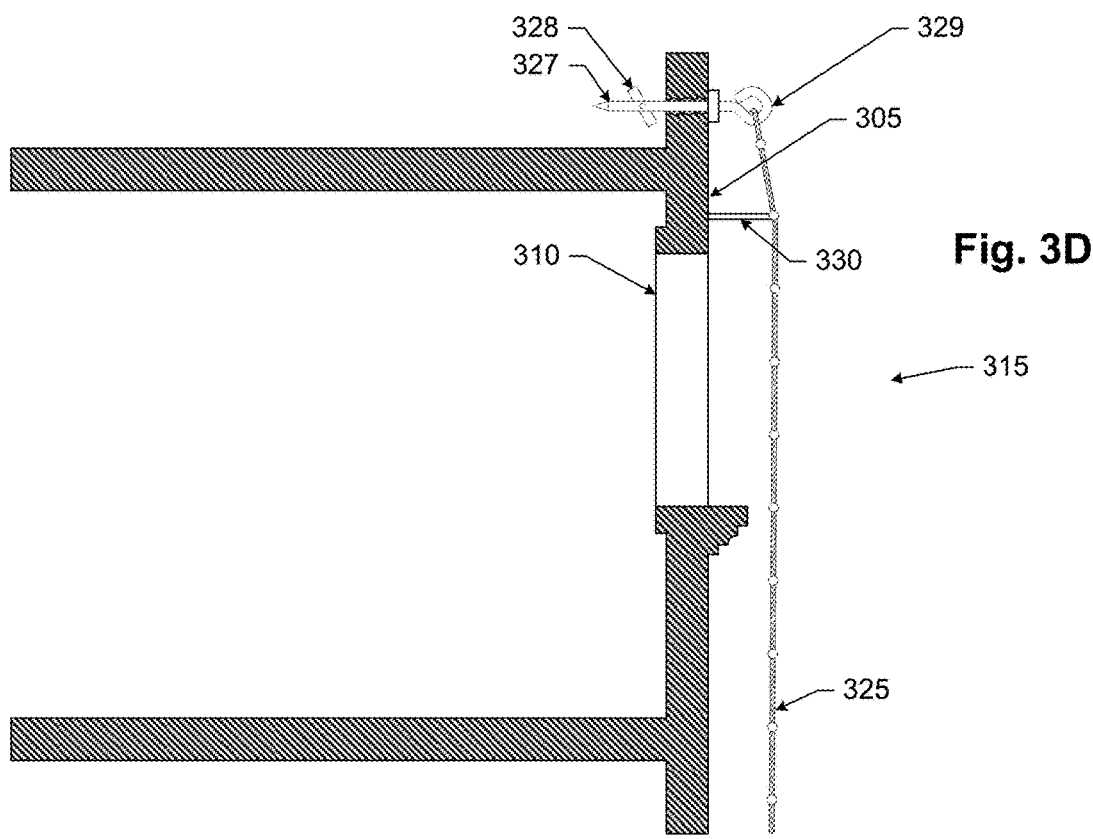

The anchor device may also incorporate more permanent anchoring technologies other than those discussed above. For example, as shown in FIG. 3D, anchoring device 329 may rely on concrete bolts 327 placed in the side of building 305 at the anchor point. Such concrete bolts 327 may require the UAV, PFD, or PFD pilot to first drill a hole to receive the concrete bolts 327. Alternatively, the UAV or PFD may utilize a powder-actuated fastener system to explosively drive concrete bolts 327 into the side of the building. A powder actuated fastener system may also be used with some metal-sided buildings. The concrete bolts may include expansion features 328 to prevent slippage after setting.

In some implementations, the D3 may be provided with multiple anchoring points along its length, e.g., one at the top of the D3 and one at the bottom of the D3. Additional anchoring points may be provided as well, such as at one or more intermediate locations along the D3's length. These additional anchoring points may have an anchoring device pre-attached, or may be equipped with features to facilitate anchoring with an anchoring device such as a powder-actuated fastener. For example, an intermediate anchoring point, in some implementations, may include a flexible tether or piece of webbing connected to the D3. The tether or webbing may have a hole through it, e.g., a hole with a grommet, to receive a power actuated fastener. Thus, the D3 may be further anchored to, for example, the side of a building. These additional anchor points may act to counteract D3 sway, and may provide a fail-safe in case another anchor fails.

Figure 4A:
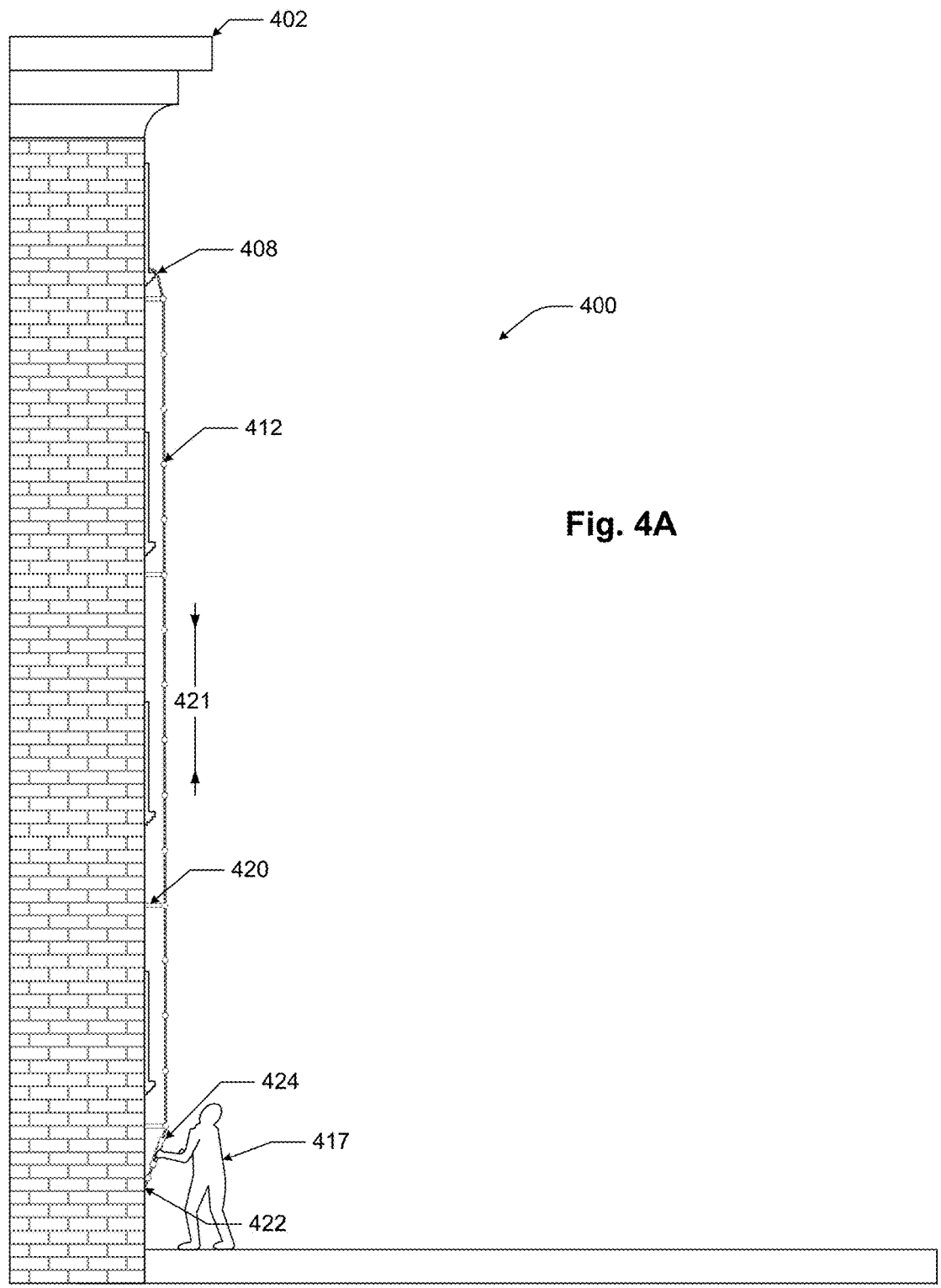
FIGS. 4A-4C illustrate various tensioning systems that may be used in some implementations.
Figure 4B:
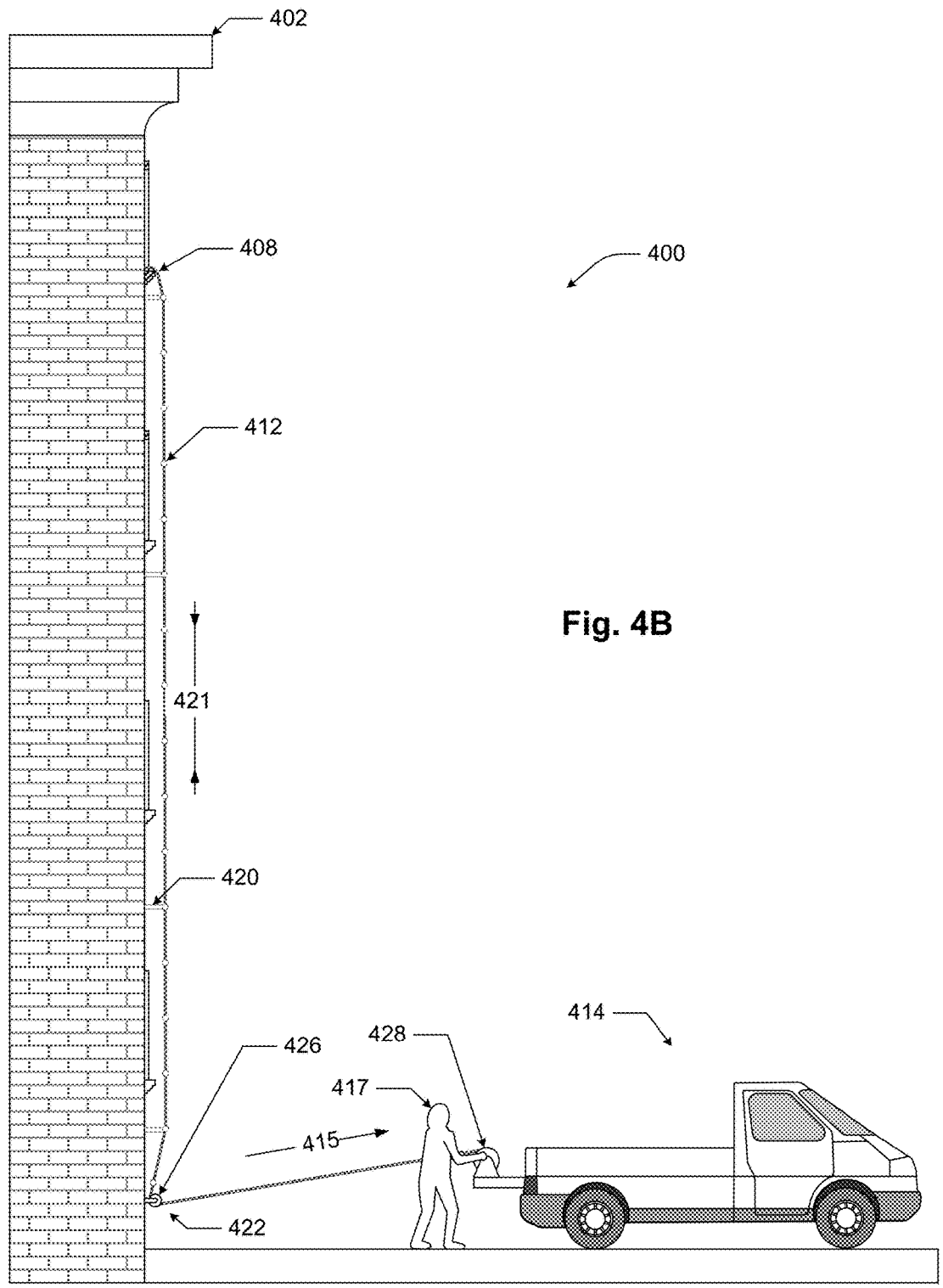
Figure 4C:
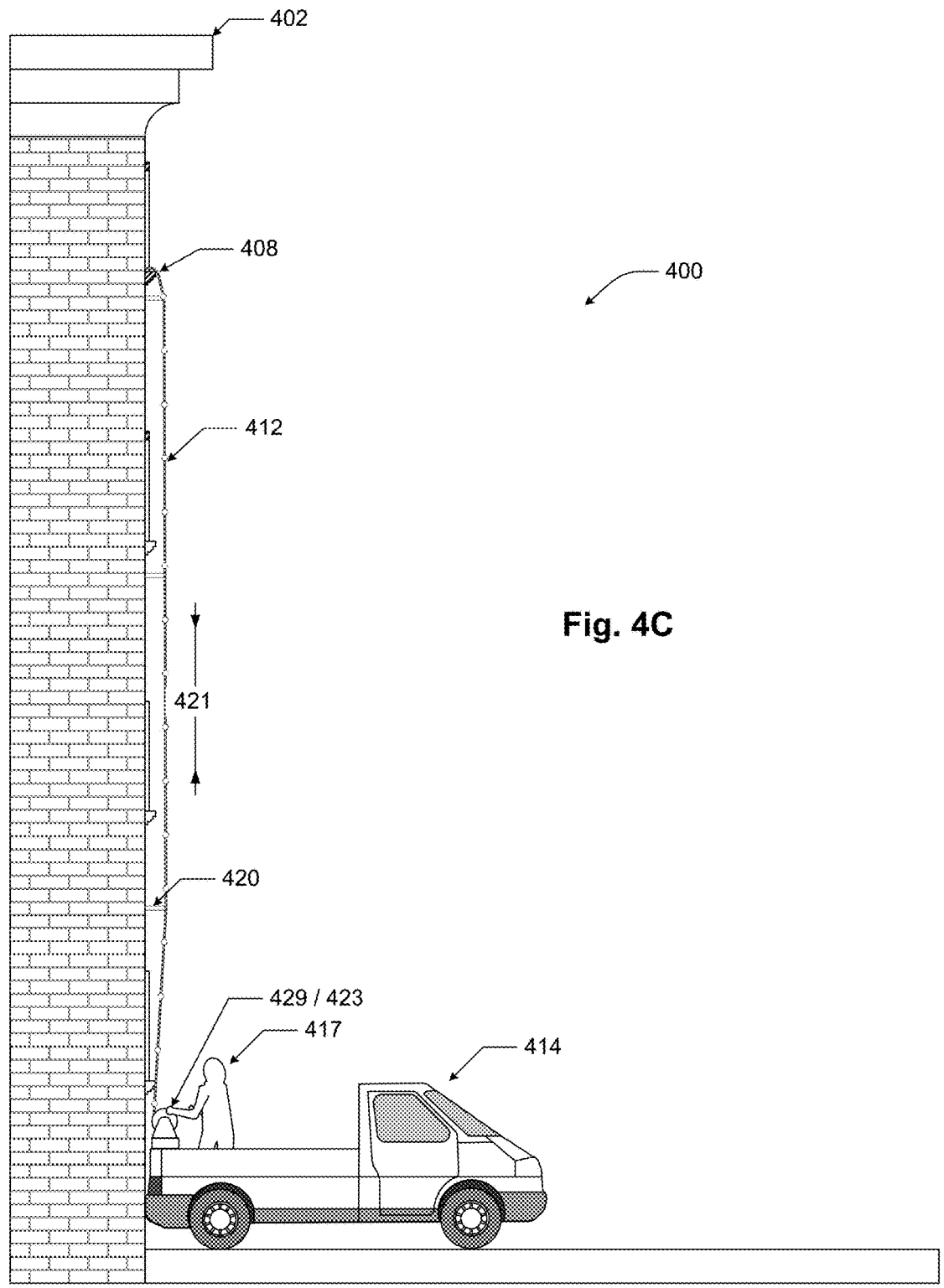

FIGS. 4A, 4B, and 4C depict building rescue site 400, which includes building 402. D3 412 has been anchored to building 402 at elevated anchor point 408. After anchoring D3 412 to elevated anchor point 408, the lower end of D3 412 may be anchored to lower anchor point 422, as shown in FIGS. 4A and 4B. FIG. 4C illustrates an implementation in which ground transport vehicle 414 is maneuvered into close proximity to building 402 and winch 429 serves as lower anchor point 423.

If D3 412 is sufficiently long, ground personnel 417 may perform the anchoring at lower anchor point 422 using any suitable technology. If the lower end of D3 412 is not accessible to ground personnel 417, methods and technologies such as those used for establishing elevated anchor point 408 may be used, e.g., a mechanical grasper or arm may be used to anchor lower anchor point 422, for example, in conjunction with a powder-actuated fastener system. This may be the case in situations where it may not be practical or safe to require rescuees to descend all the way to ground level via D3 412. For example, if the rescuees are located on the $100^{th}$ floor of a building with a fire on the $99^{th}$ floor, it would be preferable to use the UAV or PFD to deliver a D3 capable of spanning between the $100^{th}$ floor and the $98^{th}$ floor; the rescuees would then only have to descend 2 floors using the D3 instead of 100 floors. Rescue personnel may also ascend to the $98^{th}$ floor and assist rescuees in re-entering the building after using the D3. These rescue personnel may also, for example, secure the lower end of the D3 to building (in the event that a UAV or PFD is not used for such a purpose).

In particular implementations, if the D3 is a ladder-type device, the end of the D3 may be anchored such that the ladder remains in close proximity to the side of the building across the D3's span. If the D3 is a zip-line type device, then the end of the D3 may need to be anchored a considerable distance from the building to reduce the slope angle of the zipline and manage zipline speed.

While cable ladders may look relatively easy to climb, they present significant challenges to individuals who have never climbed them before. These challenges may be significantly compounded for rescuees awaiting evacuation from a burning building and who are already panicked and distressed. Cable ladders also have a predilection for swaying, twisting, and buffeting due to wind and user loading. Such behaviors may further intensify rescuees' distress. A panicked rescuee may endanger themselves, other rescuees on the D3, and the D3 itself in some situations.

Various implementations address this issue by providing equipment for inducing further tensile loads in an anchored D3 other than gravitational loading, i.e., self-loading; two examples of such equipment are depicted in FIGS. 4A and 4B. Tensioning an anchored D3 causes the D3 to experience significantly less twisting, swaying, or buffeting due to wind loading or user movements. This is because these behaviors require that the risers be capable of movement; tensioning the D3 introduces tension into the risers, which restricts the range of movement the risers will support. By introducing a tensile load into the D3, the D3 will behave much more like a rigid ladder, which will reassure rescuees using the ladder.

Tensioning may also be used to prevent flexible material rung collapse, described previously, from occurring. The tensioning equipment may be configured to induce tension not only in the risers, but in the rungs as well. This may be achieved by spacing the anchor points for each end of a D3 slightly further apart than the width of the D3 when the rungs are at full extension. By applying tension in the rungs, rungs made of flexible material may be prevented from collapsing, making it easier for rescuees to use the D3.

Tension may be introduced through any of a number of devices. For example, as shown in FIG. 4A, D3 412 may include turnbuckle or ratcheting pawl devices 424 that may be adjustable by ground personnel 417 to introduce tension 421 into D3 412. In FIG. 4B, lower anchor point 422 includes pulley 426. Ground personnel 417 may route a cable connected to the lower end of D3 412 through pulley 426 and into winch 428, which may be mounted on a fixed location, such as ground transport vehicle 414. The cable may be drawn into 415 winch 428, thereby inducing tensile load 421 in D3 412. In FIG. 4C, ground transport vehicle 414 is maneuvered to the base of building 402 and D3 412 is connected with winch 429, which also serves as lower anchor point 423. Winch 429 may then be tensioned to induce tensile load 412 in D3 412.

In some implementations, the tensioning device may be configured to be actuated by the delivery UAV or PFD. For example, if the tensioning device is a ratcheting pawl-type tensioning device, similar to those used in come-along winches or ratcheting tie-down straps, the ratchet may be configured to be driven by a ratchet drive motor located on the UAV or PFD (or the D3) rather than by a lever actuator as is common with manually-operated ratcheting pawl mechanisms. The ratchet drive motor may detach with the D3 or may remain aboard the UAV or PFD after the D3 is completely anchored and released. In implementations where the ratchet drive motor is configured to remain with the D3, the ratchet drive motor may be powered by power supplied from the UAV or PFD via a detachable power cable, although alternative or additional implementations may include a power source, e.g., a battery that is part of the ratchet drive motor assembly. In implementations where the ratchet drive motor is configured to remain with the UAV of PFD after D3 deployment and release, the ratchet drive motor may be coupled to the tensioning device via a mechanical interface configured, for example, to transmit rotational motion from the ratchet drive motor to the ratchet and to be easily removable from the ratchet when the UAV or PFD releases the D3. For example, a splined shaft connection may be used to transmit rotary motion between the ratchet drive motor and the ratchet—the splined shaft may be retracted from the ratchet after tensioning is completed.

In some implementations, a weight (in addition to the D3 weight) may be used to provide the desired tension. For example, in some implementations, the UAV or PFD may not release the bottom end of the D3 but, instead, may cease providing lift and become a dead weight, e.g., provide mass damping, on the bottom end of the D3. This may provide considerable stability to the D3.

A tensioned D3 ladder-type device may also, however, be difficult for a rescuee to use if the risers are forced flush against the side of the building by the induced tension, preventing rescuees from grasping the riser with their hands. Various implementations may include standoff devices 420 that are configured to maintain separation between the risers and the building. Standoff devices may be integrated into the design of a particular D3, or may be separate components installed using the UAV or PFD.

Standoff devices may be integrated with a particular D3. Standoff devices may also be separately attached to a building and then attached to a D3 using, for example, mechanical arms/manipulators. Standoff devices may also be configured to be attachable to a D3 at the rescue site but before delivery and deployment by a UAV or PFD. For example, a kit may be provided with a variety of different standoffs for use with different building materials. Once on-site, rescue personnel may attach standoffs to the D3 that are appropriate for the observed building materials in the regions where the D3 will be deployed. Thus, the D3 may be rapidly customized according to the nature of the building that is subject to rescue operations. The D3 may include features to allow for the rapid connection/disconnection of the various standoffs. For example, D3 rungs may include threaded holes into which standoffs may be threaded. Alternatively, D3 rungs may include quick-release features that engage with detents in the standoffs to releasably secure the standoffs to the D3. As noted, the standoff devices used may be designed to interface with specific building materials, or may be designed for universal use. Standoff devices may include materials such as rubber, adhesives, or adhesive tape in areas what are designed or intended to contact the building; the use of such materials in the standoff devices may allow the standoffs to provide lateral support to the D3 in addition to maintaining the gap between the D3 and the building. FIGS. 5A-5E depict a number of different types of D3 standoffs.

Figure 5A:
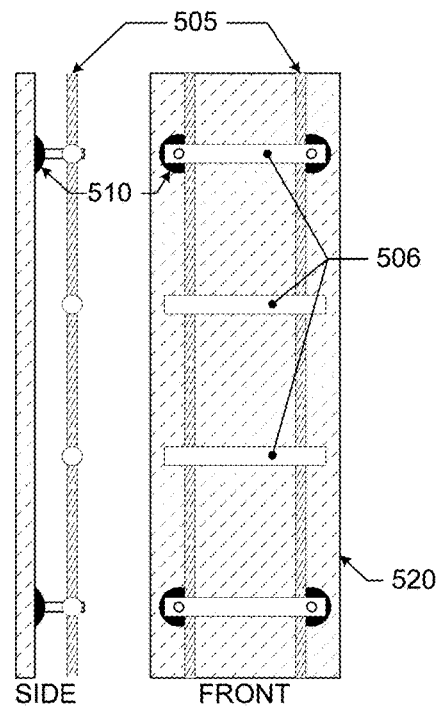
FIGS. 5A-5E illustrate various standoff technologies that may be used in some implementations.
Figure 5B:
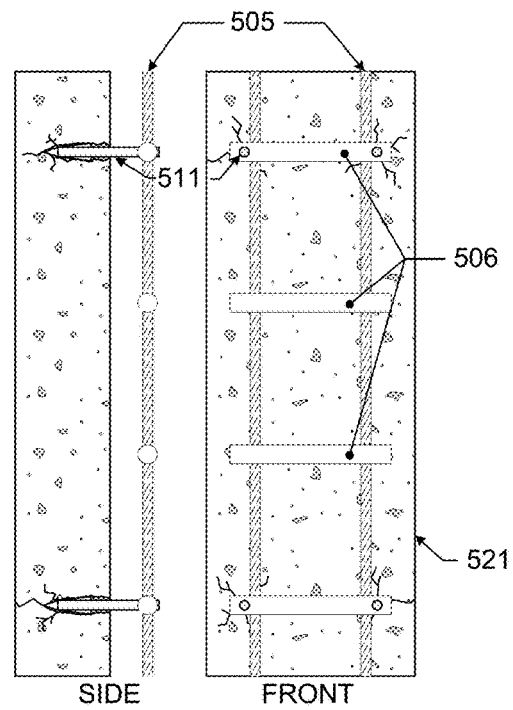
Figure 5C:
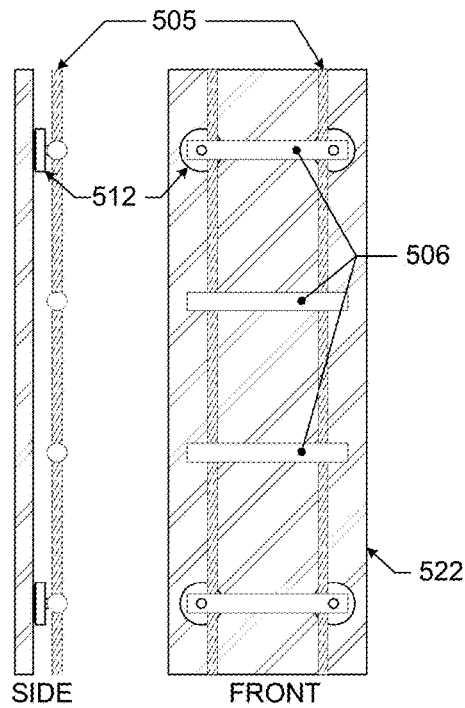

FIG. 5A depicts an implementation in which ladder-type D3 505 includes standoffs that are integrated with ladder rungs 506 and that feature suction cups 510 for interfacing to glass-sided building 520. Suction cups 510 are separated from D3 505 with a spacer. In alternative implementations, suction cups 510 are not separated from D3 505 with a spacer, but are directly mounted to rungs 506. In such cases, suction cups 510 may provide sufficient offset from building 520 to allow for easy gripping of the ladder risers by users. FIG. 5B depicts an implementation in which ladder-type D3 505 includes standoffs that are integrated with ladder rungs 506 and that feature concrete nails 511 or screws for interfacing to concrete or stone building face 521. Concrete nails 511 may be installed using powder-actuated tooling. FIG. 5C depicts an implementation in which ladder-type D3 505 includes standoffs that are integrated with ladder rungs 506 and that feature magnetic pads 512 for interfacing to metal-skinned building 522. Thus, some standoffs may also serve as anchoring points. As with the suction cup standoffs pictured in FIG. 5A, magnetic pads may or may not feature spacers to space them apart from rungs 506. Standoffs that positively engage the building face may also provide additional support for loads placed on the D3, which may relieve some of the stress on the upper anchor point.

Figure 5D:
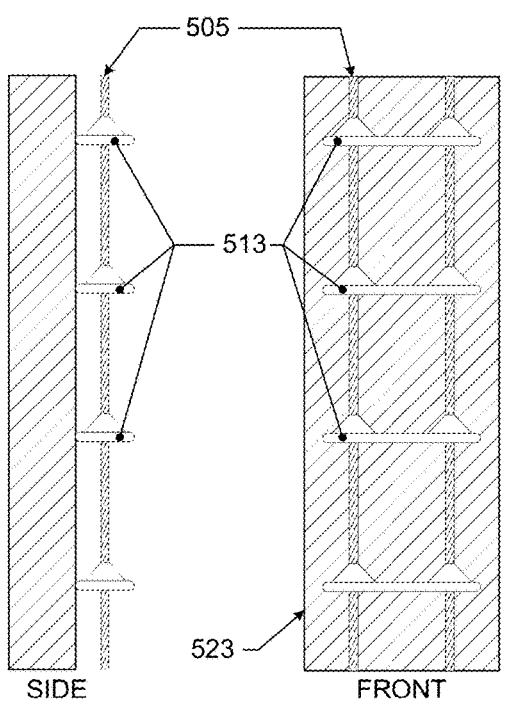
Figure 5E:
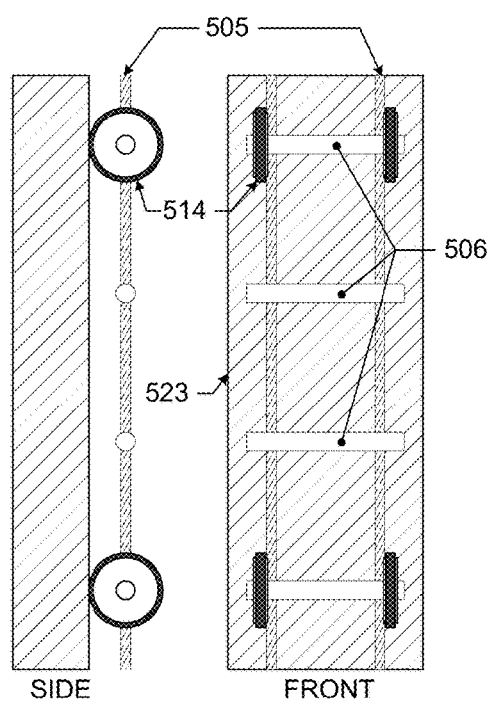

FIGS. 5D and 5E depict implementations in which the standoffs may be used with a variety of building material types. FIG. 5D depicts an implementation in which ladder-type D3 505 includes ladder steps 513 that are designed to contact the side of building 523. Ladder steps 513 may feature a rubber edge material to provide friction against building 523. FIG. 5E depicts an implementation in which ladder-type D3 505 includes rollers 514 on some of rungs 506. Rollers 514 may be free to rotate, although a rubber tread on rollers 514 may be used to prevent lateral displacement of D3 505. Rollers 514 may allow D3 505 to be tensioned without encountering resistance that fixed standoffs might produce. Rollers 514 are also self-aligning and would require little or no adjustment by a UAV.

Two techniques utilizing a UAV- or PFD-delivered D3 are detailed in FIGS. 6 and 7, which are described below. It should be noted that not all of the operations depicted and described are necessarily required in accordance with the present invention; all or just some of the operations described may be performed, as well as further operations. A number of the operations are provided for context to facilitate description and understanding of the invention, but are optional in some implementations.

Figure 6:
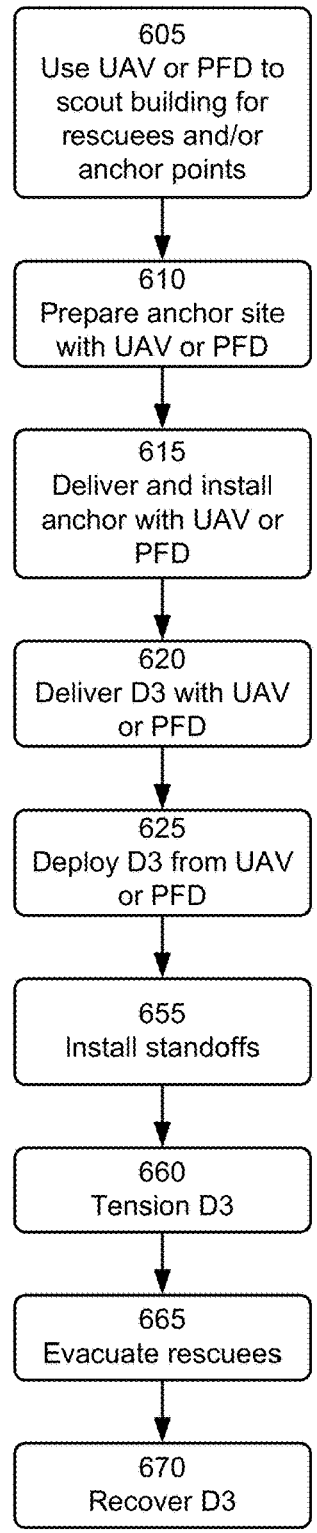
FIG. 6 provides a flowchart for one implementation.

FIG. 6 illustrates operations in a technique for rescuing trapped rescuees from a building. In 605, the UAV or PFD, which may have been transported to the general vicinity of the building, is flown around the building to scout for potential rescuees and anchor points. The UAV or PFD may utilize video or still cameras to do this, or may use other, more sophisticated equipment, such as radar, thermal imaging, or other advanced detection equipment. The UAV may, itself, have the capability to recognize such entities using machine vision, although a human operator will likely monitor the UAV's sensor feeds to ensure that the UAV does not pass a potential target by. In the case of a manned PFD, the pilot may perform such scouting and anchor site evaluation. 605 is optional; it may be that rescuees and anchor points are already known to rescuers without the need for UAV or PFD scouting.

In 610, the UAV, PFD, or PFD pilot may prepare the anchor site to receive the anchor. This may involve, for example, the UAV, PFD, or PFD pilot breaking a window so that an interior building column may be used as an anchor point. It may involve drilling or blasting holes for concrete anchors. It may involve clearing away debris or rubble that would interfere with placement of a J-hook. 610 may be optional; it may be that a suitable anchor site exists and requires no preparation.

In 615, the UAV or PFD may be used to deliver an anchor device to the anchor location. In some implementations, 615 and 610 may be performed at the same time. For example, a concrete anchor may be placed using a powder-actuated tool. In such a scenario, the anchor self-drills the hole that receives it. The UAV or PFD may be maneuvered to place the anchor device in the proper location. The UAV or PFD may include tools or manipulators that may then be used to connect the anchor to the anchor location, if necessary.

In 620, the UAV or PFD may be used to deliver the D3 to the anchor site. Again, in some implementations, 620 may be performed in conjunction with 615 and/or 610. The UAV may attach the D3 to the anchor device in 620 if the D3 is not already attached to the anchor device.

In 625, the D3 is deployed from the UAV or PFD. For example, the D3 may be unwound from a carrier spool or may simply be dropped and allowed to self-unwind. After or during deployment, the UAV or PFD may release the D3.

In 655, standoffs may be installed between the D3 and the building side. The numbering used in FIG. 6 does feature a sudden jump in numbering; this was done to allow operations depicted in FIG. 6 to be similarly numbered with respect to similar operations in FIG. 7. The reader should not construe this jump to mean that FIG. 6 is "missing" operations 630, 635, . . . , 650. The UAV or PFD may be used to install standoffs to the building side and to then connect the standoffs to the D3. Alternatively, the UAV or PFD may be used to position standoffs already connected to the D3. In some implementations, the D3 may include standoffs that are pre-deployed or self-deploying and require no action using the UAV of PFD, such as rollers or spheres connected to the ends of various rungs on a D3. The standoffs may also be in the form of hemispheres, with each hemisphere arranged such that the flat side of the hemisphere is substantially parallel to a building face when the D3 is deployed and the spherical surface of the hemisphere contacts the building face when the D3 is deployed. If D3 is a zipline, this step may not be required.

In 660, the D3 is tensioned, either by hand or using equipment mounted on the UAV or PFD, such as a ratchet drive motor, or mounted elsewhere, e.g., a winch mounted to a ground vehicle or secured to the ground or other suitably stationary location. The D3 may be tensioned to a load higher than the anticipated working load to proof-test the D3 installation. After successful proof tensioning is performed, then the tension may be decreased to avoid overloading the D3 once rescuees start to descend using the D3 (thus adding their weight to the pre-existing D3 tension). If the D3 cannot be safely tensioned due, for example, to a faulty anchor or slipping standoff, the D3 placement may be attempted again, perhaps at a different location. In such cases, 610 through 660 may need to be repeated as needed.

In 665, the rescuees may self-rescue by climbing down the installed D3. In some scenarios, ground personnel may climb up the installed D3 to assist stranded or injured rescuees.

In 670, the UAV or PFD may be used to recover the deployed D3 after the rescuees have been evacuated. This step is, of course, optional, and may not be practical if doing so exposes the UAV to risk. Retrieval may be implemented using, for example, a mechanical arm/manipulator on the UAV or PFD, or other equipment capable of securing the D3.

Figure 7:
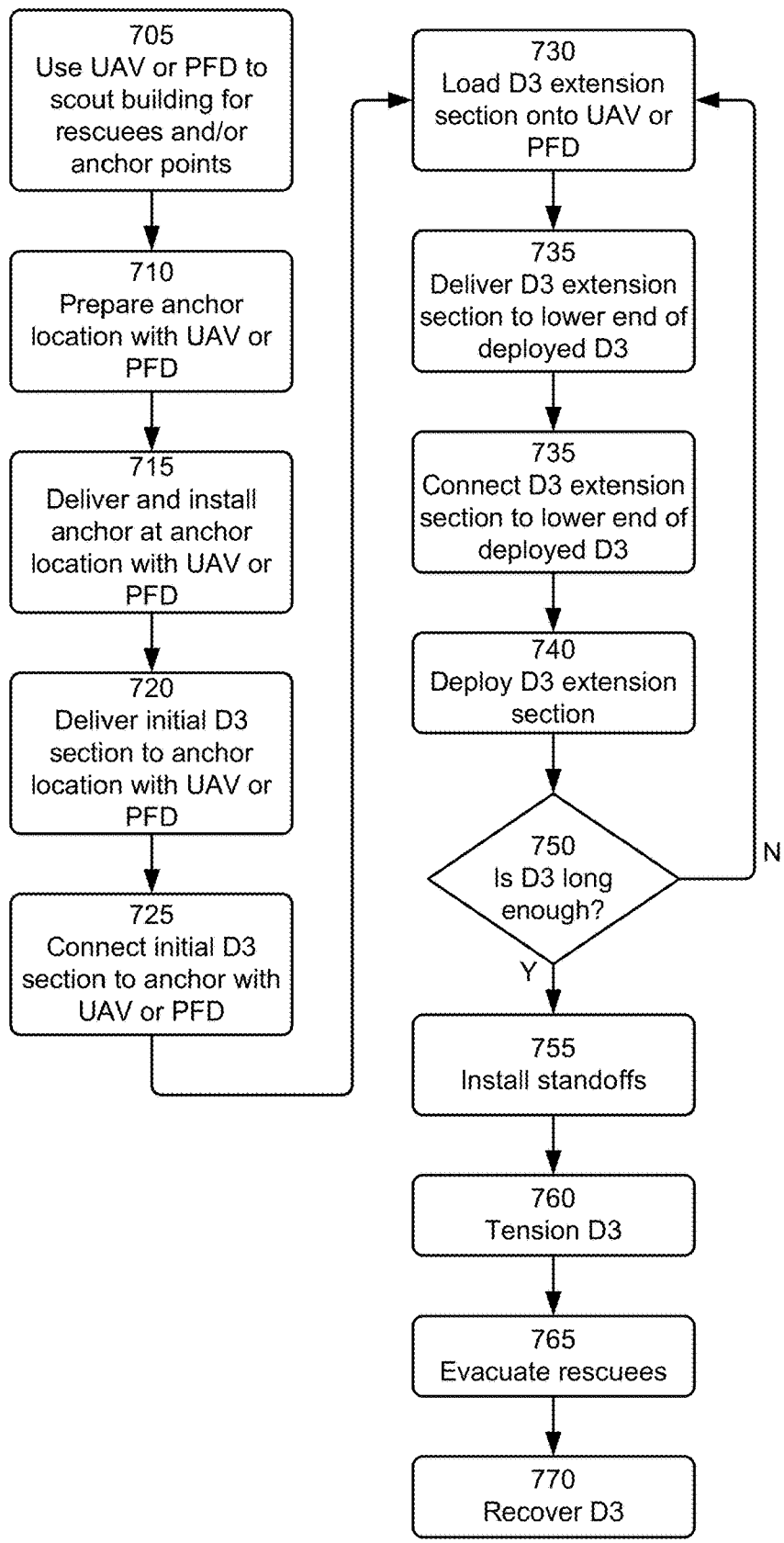
FIG. 7 provides a flowchart for an implementation featuring a sectioned deployable descent device.

FIG. 7 depicts a similar process to that depicted in FIG. 6, but features an implementation utilizing a sectioned D3. 705 through 725 are similar to 605 through 625 in FIG. 6; the reader is referred to the description of FIG. 6 for discussion of these operations. The chief difference between 705 through 725 of FIG. 7 and their analogues in FIG. 6 is that the D3 featured in these steps of FIG. 7 is the initial section of a sectioned D3.

In 730, which begins after the initial D3 section has been attached to the anchor point, a D3 extension section may be loaded onto the UAV or PFD. In some implementations, multiple UAVs or PFDs may be used simultaneously allow performance of the technique depicted in FIG. 7 to be accelerated. For example, a first UAV or PFD may be used to deliver the D3 as described in 720 while a second UAV or PFD may be loaded with the D3 extension section.

In 735, the D3 extension section may be delivered by the UAV or PFD to the lower end of the deployed D3. In 740, the UAV or PFD may be used to connect the delivered extension section to the lower end of the D3. In 740, the D3 extension section is deployed.

In 750, an evaluation may be made as to whether the assembled D3 is of sufficient length. If not, the technique returns to 730 and begins again with a new D3 extension section. If so, the technique may continue on to 755 through 770, which mirror 655-670 in FIG. 6.

Figure 9A:
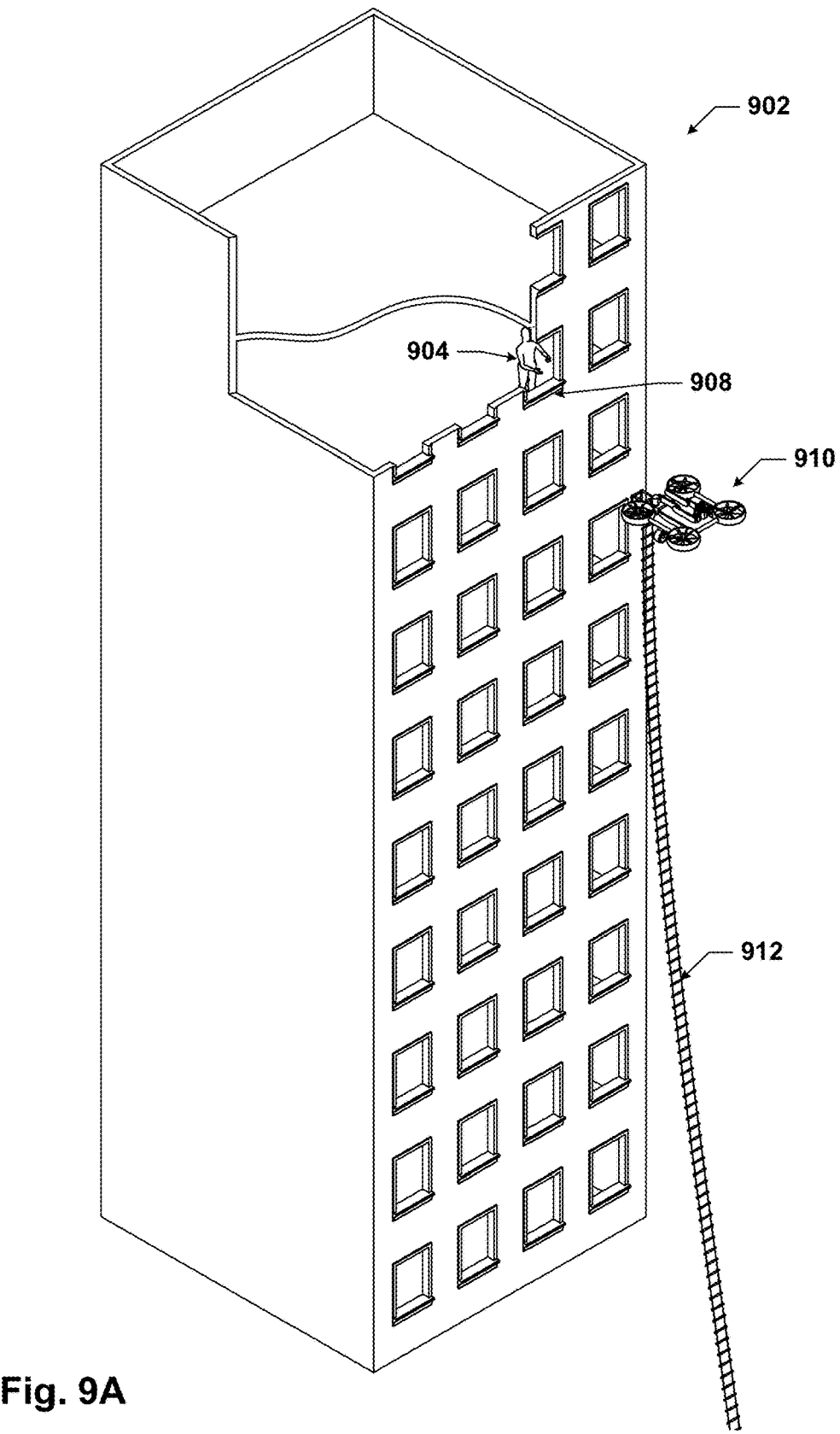
FIGS. 9A-9H depict isometric views of various stages of deployable descent device installation as performed by a UAV with mechanical manipulator arms.
Figure 9B:
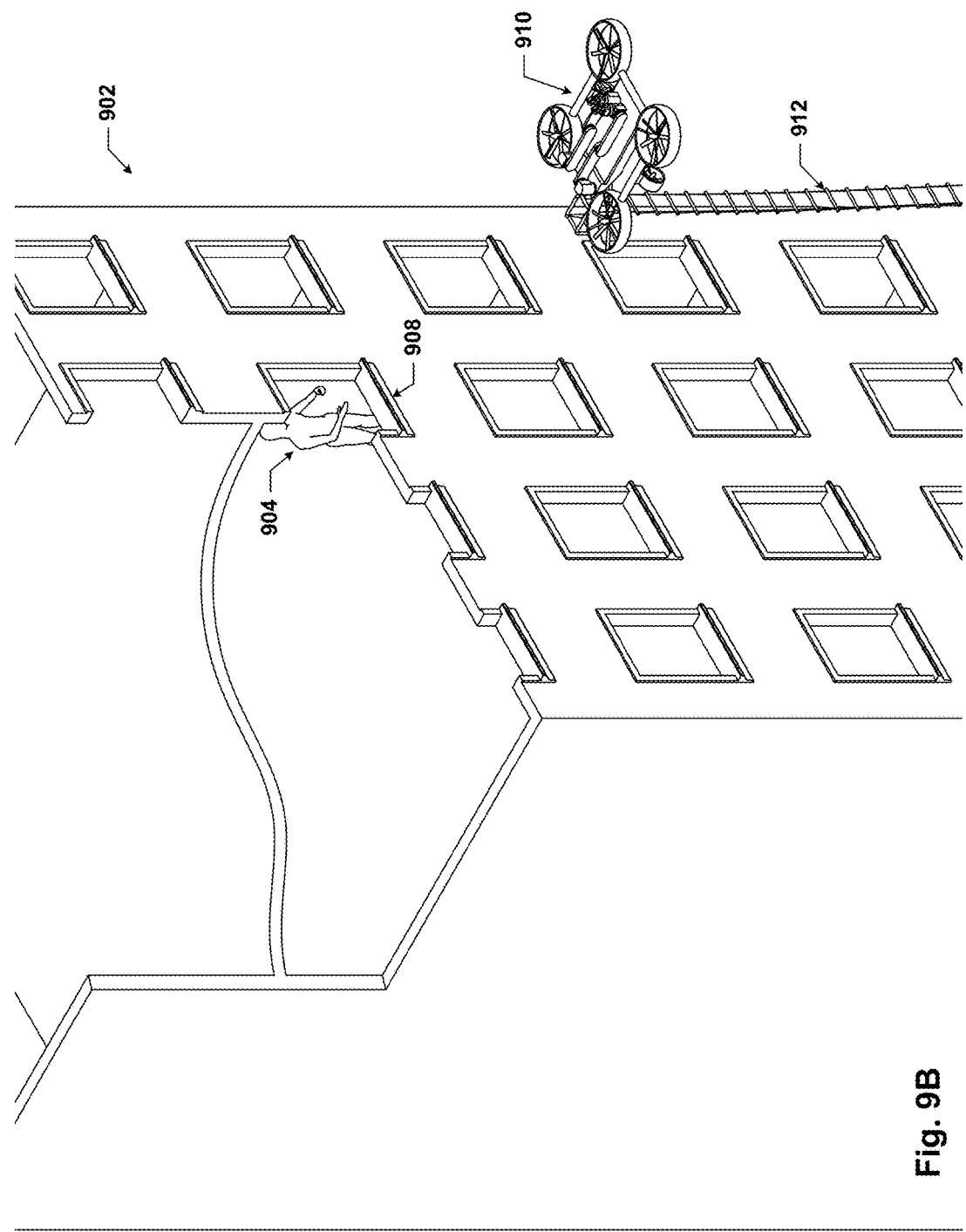

A graphical depiction of another D3 delivery method using a mechanical arm-equipped UAV is shown in FIGS. 9A-9H. In FIG. 9A, a 10-story building 902 is shown, although with a cutaway section through the top two floors to allow rescuee 904 to be seen. Rescuee is awaiting rescue at elevated location 908, which, in this example, is a window sill. UAV 910 is approaching elevated location 908 with D3 912. FIG. 9B is a detail view of the rescue area of FIG. 9A.

Figure 9C:
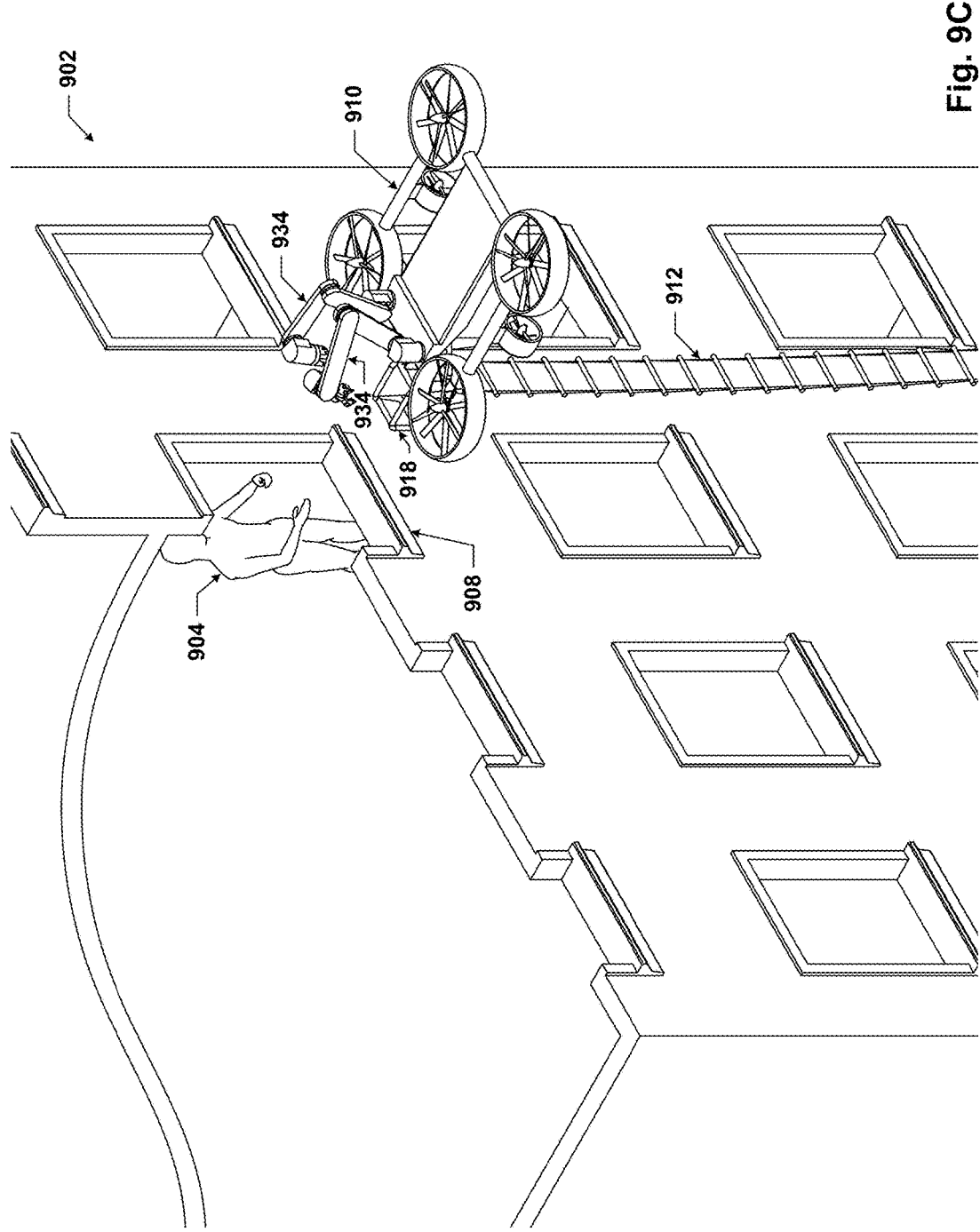

In FIG. 9C, UAV 910 has maneuvered close to elevated location 908, and has deployed mechanical manipulator arms 934 from their stored state. Also visible in greater detail is anchor device 918, which is supported by a mechanical interface (not visible in this view, but similar to that visible in FIGS. 8A and 8B).

Figure 9D:
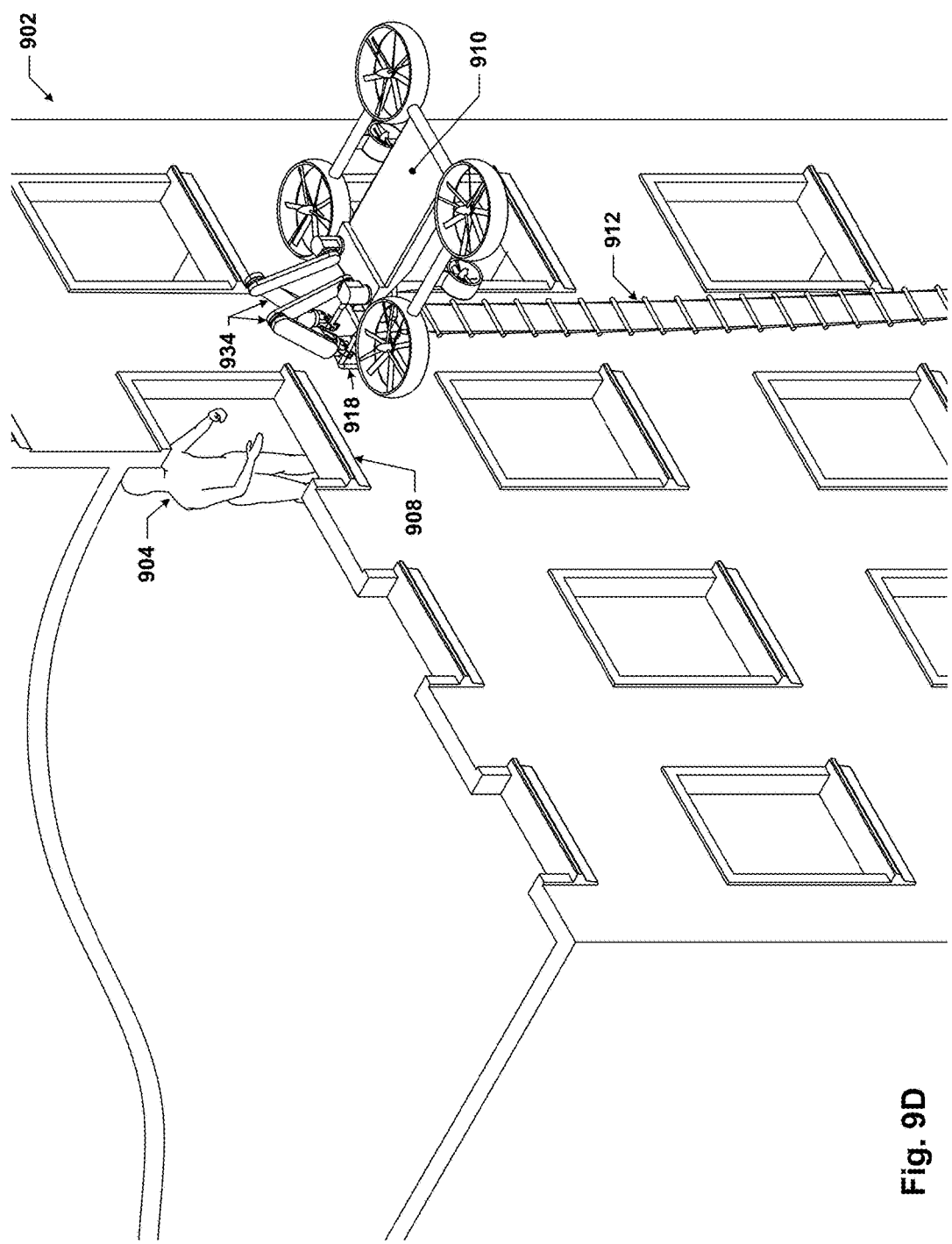

In FIG. 9D, mechanical manipulator arms 934 have been positioned so as to place mechanical graspers on the ends of manipulator arms 934 around portions of anchor device 918. This may allow mechanical manipulator arms 934 to grasp anchor device 918 and lift it clear of the mechanical interface.

Figure 9E:
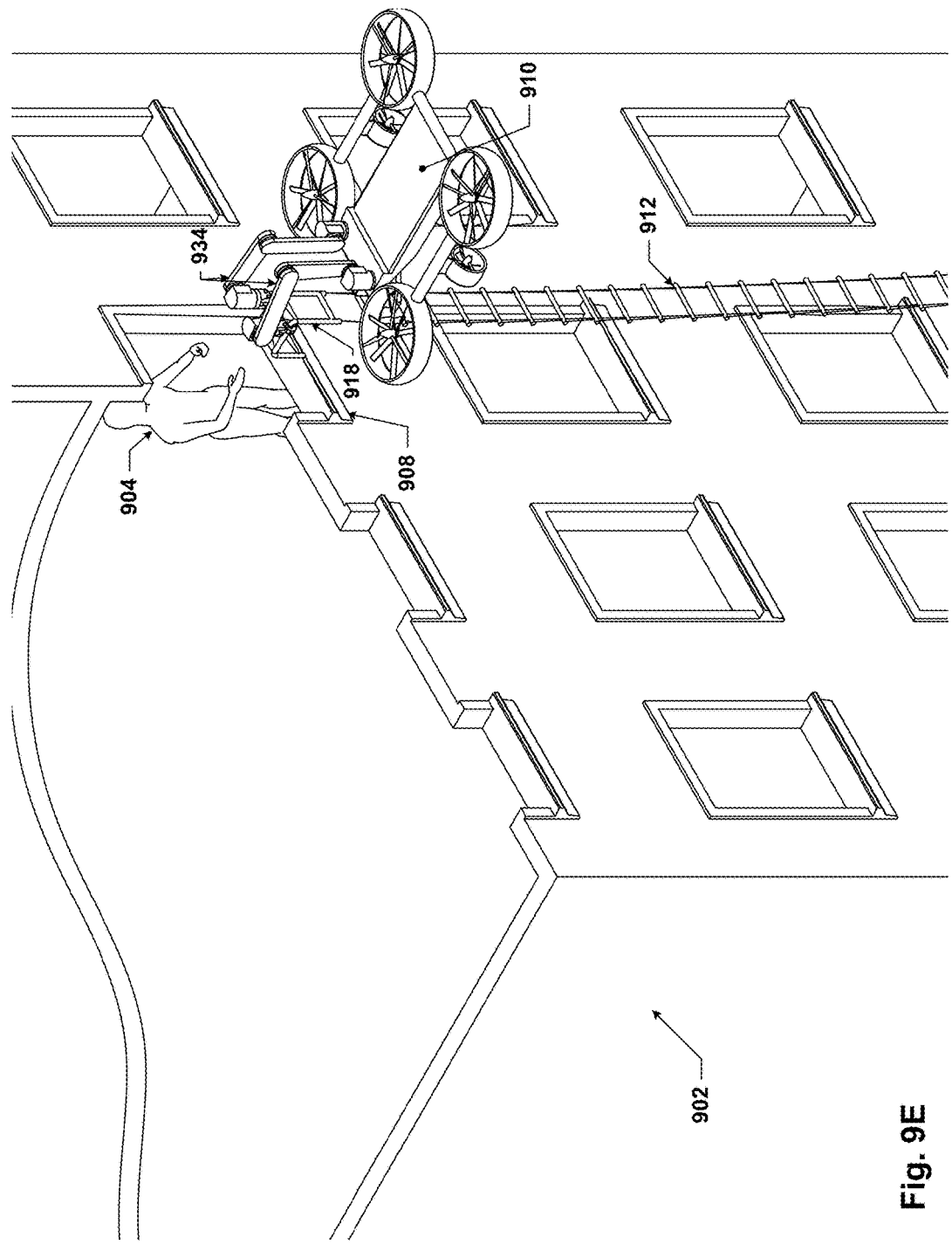
Figure 9F:
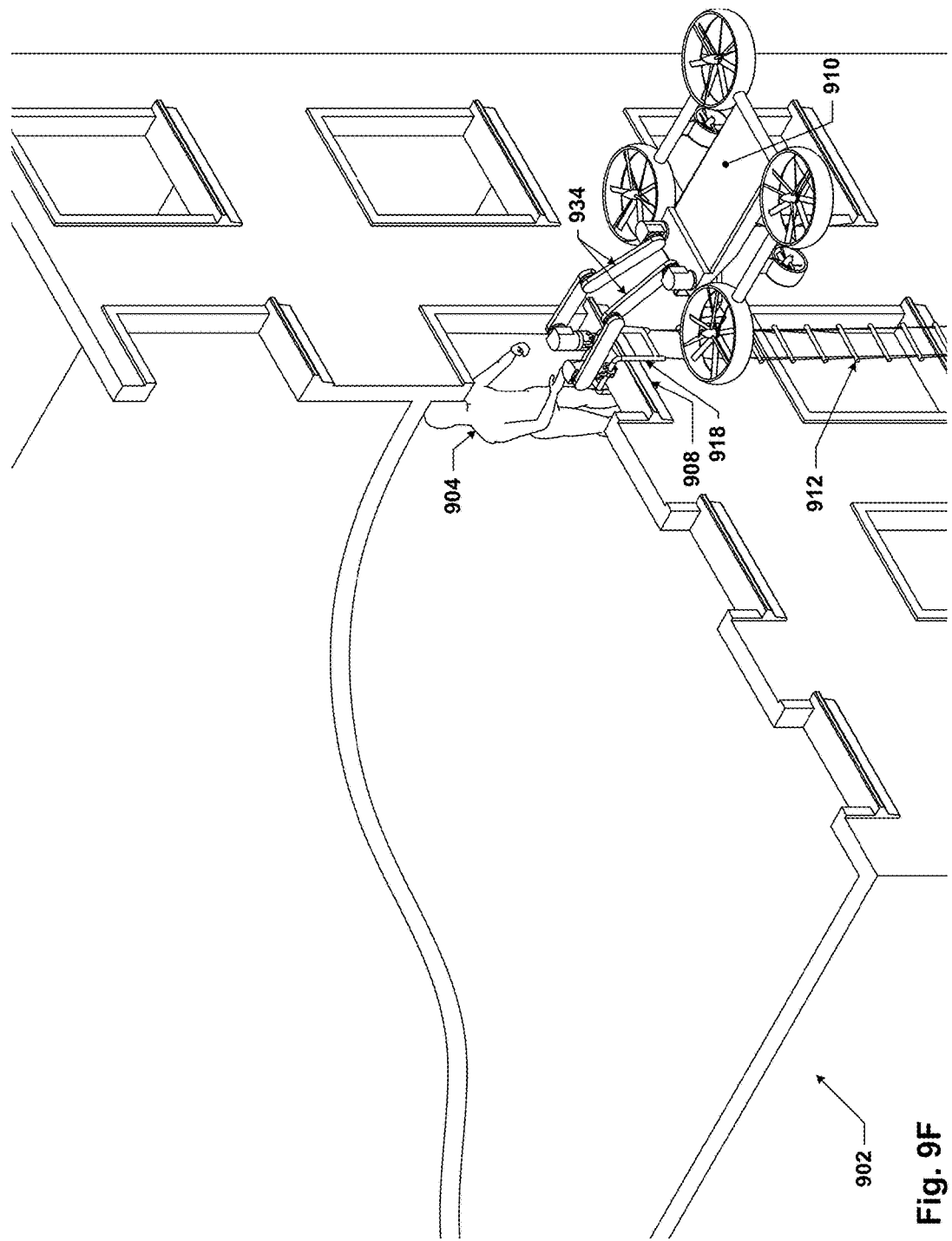

In FIG. 9E, mechanical manipulator arms 934 have lifted anchor device 918 clear of the mechanical interface and are moving anchor device 918 towards elevated location 908. In FIG. 9F, mechanical manipulator arms 934 have lowered anchor device 918 over the window sill at elevated location 908, and D3 912 is nearly ready for use.

Figure 9G:
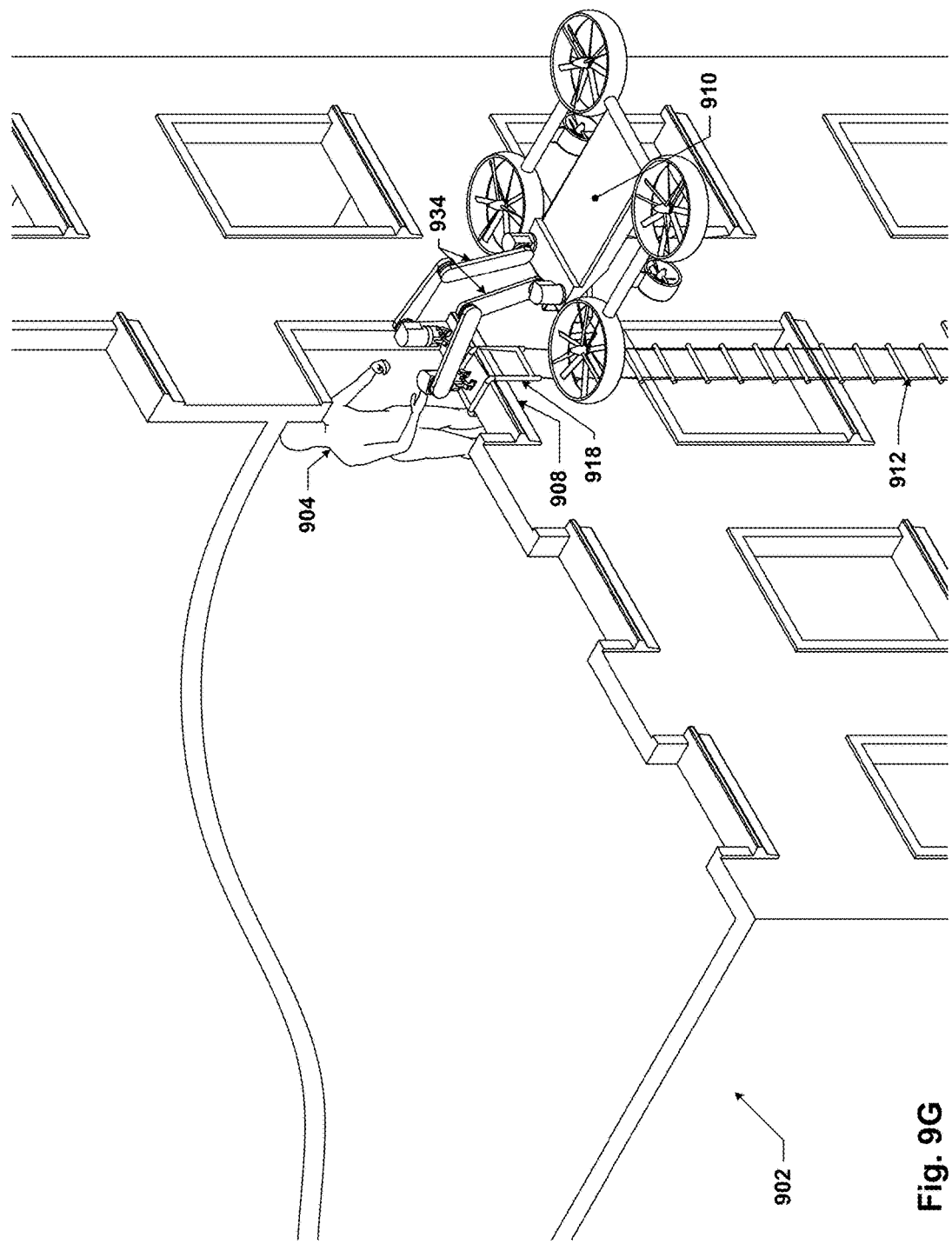
Figure 9H:
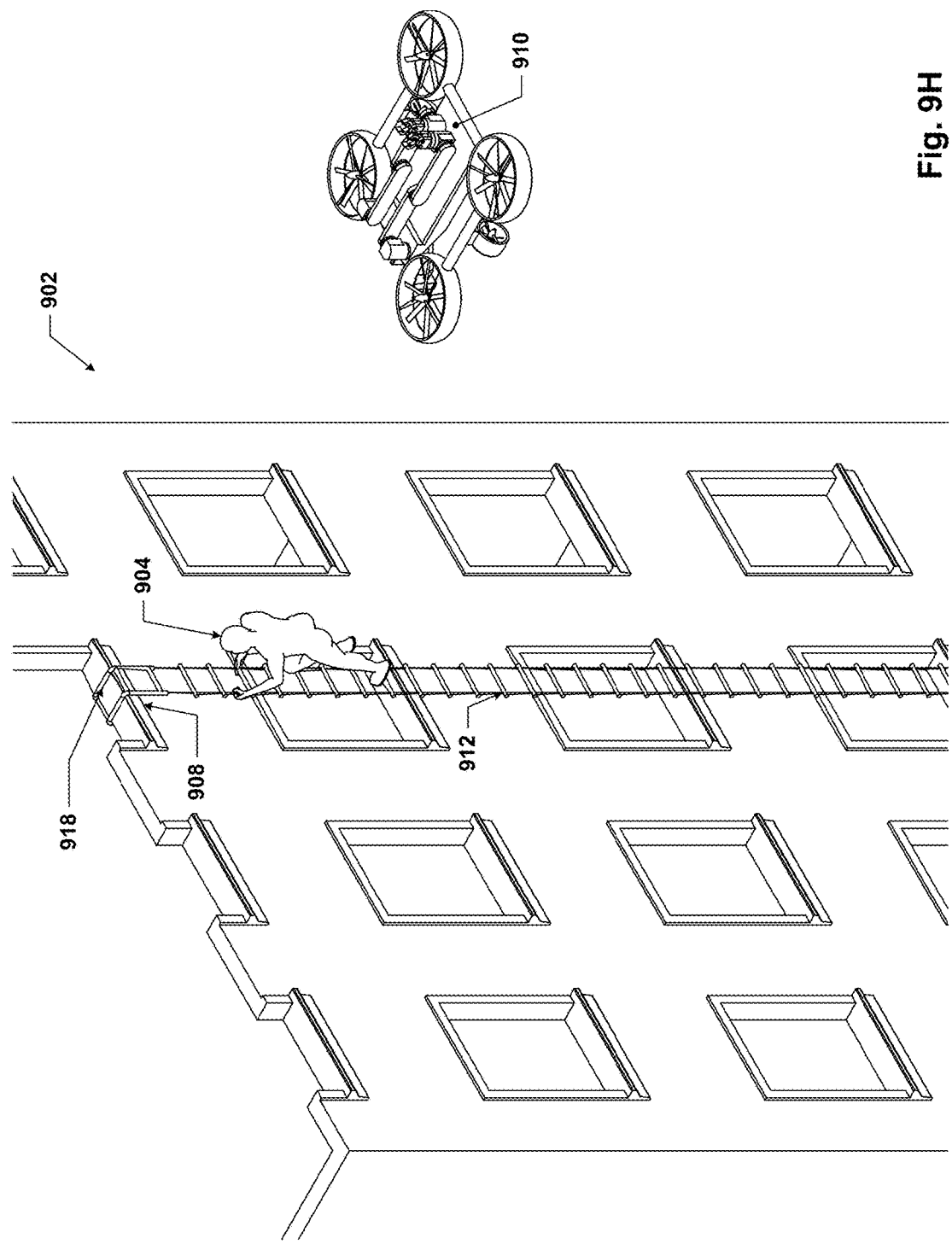

In FIG. 9G, mechanical manipulator arms 934 have released anchor device 918, which is now hooked over the window sill. In FIG. 9H, UAV 910 has stowed mechanical manipulator arms 934 again, and is maintaining station some distance away from the building. This may allow for UAV 910 to be ready to perform other actions, such as adjusting the positioning of D3 912, providing video of the elevated location to ground personnel, or remaining on-site to retrieve D3 912 when rescue operations are complete. In FIG. 9G, rescuee 904 has started climbing down D3 912.

While FIGS. 9A-9H depict deployment of a D3 using a mechanical manipulator arm-equipped UAV, similar operations may be performed using a PFD. For example, a PFD equipped with similar mechanical manipulator arms may be used to in much the same manner. The mechanical manipulator arms on such a PFD may be controlled by a human riding the PFD (or carried by the PFD) using controls on the PFD or, in some implementations, the mechanical manipulator arms may be controlled remotely by ground personnel. Alternatively, some of the tasks depicted may be performed directly by a human riding the PFD (or carried by the PFD). For example, a human PFD pilot may place the PFD into an autopilot, station-keeping mode (or, alternatively, surrender piloting control of the PFD to ground personnel using a remote link to communicate with and control the PFD) and then use their own arms and hands to grab the anchor device and place it in position at the elevated location while the PFD is hovering in place in close proximity to the elevated location. The human PFD pilot may also perform other actions, such as using powder-actuated fasteners, drills, hammers, etc. to place anchor devices, place and/or adjust standoffs, perform tensioning, etc.

Although several implementations of this invention have been described in detail herein with reference to the accompanying drawings, it is to be understood that the invention is not limited to these precise implementations, and that various changes and modifications may be effected therein by one skilled in the art without departing from the scope of spirit of the invention as defined in the appended claims.

It is also to be recognized that, unless physically incompatible, the various D3 anchoring devices, deployment systems, carrying structures, and so forth described in the context of a UAV implementation may also be implemented, with appropriate modification, in a PFD implementation, and vice versa.

I claim:

1. A system comprising:
   a deployable descent device, the deployable descent device having a first end and a second end; and
   an aerial vehicle having a body and plurality of vertical lifters configured to provide lift to the body, the aerial vehicle configured to:
      deliver the first end of the deployable descent device to an elevated location at a side of a building while supporting the first end of the deployable descent device outboard of the vertical lifters,
      anchor, while the first end of the deployable descent device is supported by the aerial vehicle, the first end of the deployable descent device to a feature that is on the side of the building at the elevated location or to a feature that is accessible through the side of the building via an opening in the side of the building at the elevated location, and
      release the first end of the deployable descent device after the first end of the deployable descent device is anchored to the feature that is on the side of the building at the elevated location or to the feature that is accessible through the side of the building via the opening in the side of the building at the elevated location.

2. The system of claim 1, wherein the aerial vehicle further includes a mechanical interface that is configured to mate with the first end of the deployable descent device and support the first end of the deployable descent device during delivery of the deployable descent device to the elevated location at the side of the building.

3. The system of claim 1, wherein:
   the aerial vehicle further includes at least one mechanical manipulator arm mounted to the body, and
   the at least one mechanical manipulator arm is configured to anchor the first end of the deployable descent device to the feature on the side of the building at the elevated location or to anchor the first end of the deployable descent device to the feature accessible through the opening in the side of the building at the elevated location.

4. The system of claim 2, wherein the mechanical interface is positioned in a fixed location with respect to the body of the aerial vehicle.

5. The system of claim 4, wherein the aerial vehicle further includes a support structure that supports the mechanical interface in the fixed location relative to the body of the aerial vehicle.

6. The system of claim 4, wherein:
   the deployable descent device is a ladder,
   the first end of the ladder is equipped with a hook having a shank portion and a bend portion, and
   the mechanical interface is configured to mate with the hook and support the hook such that the bend portion of the hook is further outboard of the aerial vehicle than the shank portion and such that the bend portion of the hook is higher than the shank portion.

7. The system of claim 4, wherein the deployable descent device is a flexible ladder and the system further comprises a winch that is configured to be securable to a location at ground level and to apply a tensioning load to the flexible ladder after the flexible ladder is anchored to the feature that is on the side of the building at the elevated location or to the feature that is accessible through the side of the building via the opening in the side of the building at the elevated location.

8. The system of claim 4, wherein the deployable descent device is a flexible ladder and the system further comprises a pulley that is configured to be securable to a location at ground level and to receive a cable attachable to the flexible ladder.

9. The system of claim 4, wherein the deployable descent device is a flexible ladder and the system further comprises:
a ground vehicle; and
a winch that is mounted to the ground vehicle and configured to apply a tensioning load to the flexible ladder after the flexible ladder is anchored to the feature that is on the side of the building at the elevated location or to the feature that is accessible through the side of the building via the opening in the side of the building at the elevated location.

10. The system of claim 5, wherein the support structure is a rigid external framework.

11. The system of claim 6, wherein the ladder is selected from the group consisting of: a flexible ladder and a segmented ladder.

12. The system of claim 11, wherein the ladder is stored in a ground-based container that is configured to permit the ladder to be lifted out of the ground-based container by the aerial vehicle.

13. The system of claim 11, wherein the ladder includes two or more standoffs configured to offset a substantial portion of the ladder from the side of the building when the first end of the deployable descent device is anchored to the feature.

14. An aerial vehicle comprising:
a body; and
a plurality of vertical lifters configured to provide lift to the body, the aerial vehicle configured to:
deliver the first end of a deployable descent device to an elevated location at a side of a building while supporting the first end of the deployable descent device outboard of the vertical lifters,
anchor, while the first end of the deployable descent device is supported by the aerial vehicle, the first end of the deployable descent device to a feature that is on the side of the building at the elevated location or to a feature that is accessible through the side of the building via an opening in the side of the building at the elevated location, and
release the first end of the deployable descent device after the first end of the deployable descent device is anchored to the feature that is on the side of the building at the elevated location or to the feature that is accessible through the side of the building via the opening in the side of the building at the elevated location.

15. The aerial vehicle of claim 14, wherein the aerial vehicle further includes a mechanical interface that is configured to mate with the first end of the deployable descent device and support the first end of the deployable descent device during delivery of the deployable descent device to the elevated location at the side of the building.

16. The aerial vehicle of claim 14, wherein:
the aerial vehicle further includes at least one mechanical manipulator arm mounted to the body, and
the at least one mechanical manipulator arm is configured to anchor the first end of the deployable descent device to the feature on the side of the building at the elevated location or to anchor the first end of the deployable descent device to the feature accessible through the opening in the side of the building at the elevated location.

17. The aerial vehicle of claim 15, wherein the mechanical interface is positioned in a fixed location with respect to the body of the aerial vehicle.

18. The aerial vehicle of claim 15, wherein the mechanical interface is configured to mate with the first end of the deployable descent device using a releasable mechanism selected from the group consisting of: electrically-driven threaded fasteners, computer-controlled release latches, pyrotechnic fasteners, frangible nuts, and cable cutters.

19. The aerial vehicle of claim 17, wherein the aerial vehicle further includes a support structure that supports the mechanical interface in the fixed location relative to the body of the aerial vehicle.

20. The aerial vehicle of claim 17, wherein:
the deployable descent device is a ladder,
the first end of the ladder is equipped with a hook having a shank portion and a bend portion, and
the mechanical interface is configured to mate with the hook and support the hook such that the bend portion of the hook is further outboard of the aerial vehicle than the shank portion and such that the bend portion of the hook is higher than the shank portion.

21. The aerial vehicle of claim 19, wherein the support structure is a rigid external framework.

* * * * *